United States Patent
Khoshnevisan et al.

(10) Patent No.: US 11,405,094 B2
(45) Date of Patent: Aug. 2, 2022

(54) DEFAULT QUASI CO-LOCATION ASSUMPTION AFTER BEAM FAILURE RECOVERY FOR SINGLE-DOWNLINK CONTROL INFORMATION-BASED MULTIPLE TRANSMIT RECEIVE POINT COMMUNICATION

(71) Applicant: QUALCOMM Incorporated, San Diego, CA (US)

(72) Inventors: Mostafa Khoshnevisan, San Diego, CA (US); Tao Luo, San Diego, CA (US); Xiaoxia Zhang, San Diego, CA (US); Yan Zhou, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 85 days.

(21) Appl. No.: 16/953,161

(22) Filed: Nov. 19, 2020

(65) Prior Publication Data

US 2021/0226688 A1 Jul. 22, 2021

Related U.S. Application Data

(60) Provisional application No. 62/961,948, filed on Jan. 16, 2020.

(51) Int. Cl.
  *H04B 7/08* (2006.01)
  *H04B 7/024* (2017.01)
  (Continued)

(52) U.S. Cl.
  CPC ............. *H04B 7/088* (2013.01); *H04B 7/024* (2013.01); *H04W 72/042* (2013.01);
  (Continued)

(58) Field of Classification Search
  CPC ...... H04B 7/088; H04B 7/024; H04B 7/0695; H04W 72/042; H04W 72/0453;
  (Continued)

(56) References Cited

U.S. PATENT DOCUMENTS

2019/0141691 A1    5/2019 Kwon et al.
2019/0349061 A1*  11/2019 Cirik .................... H04L 1/1858
(Continued)

OTHER PUBLICATIONS

International Search Report and Written Opinion—PCT/US2020/065390—ISA/EPO—dated Apr. 8, 2021.
(Continued)

*Primary Examiner* — Harry H Kim
(74) *Attorney, Agent, or Firm* — Procopio, Cory, Hargreaves & Savitch LLP

(57) ABSTRACT

Default QCL assumptions for UEs and base stations to apply after identifying a new beam in response to beam failure detection are provided for single-DCI multi-TRP communication. In one aspect, a default QCL assumption for PDSCH after beam failure detection may be applied based on TCI states corresponding to a lowest codepoint among the TCI codepoints containing two different states. In another aspect, a default QCL assumption for PDSCH after beam failure detection may be applied based on at least one of: a lowest CORESET-ID in a latest monitored slot, a selected RS index during beam failure recovery, CORESET-0, or a first TCI state corresponding to the lowest TCI codepoint indicating two TCI states. Additionally, default QCL assumptions for UEs and base stations to apply during beam failure recovery are provided for single-DCI multi-TRP communication when the UE is not configured with a set of beam failure detection resources.

30 Claims, 12 Drawing Sheets

(51) Int. Cl.
- *H04W 72/04* (2009.01)
- *H04W 76/27* (2018.01)
- *H04W 80/02* (2009.01)
- *H04W 76/19* (2018.01)
- *H04L 5/00* (2006.01)
- *H04B 7/06* (2006.01)

(52) U.S. Cl.
CPC ... *H04W 72/0453* (2013.01); *H04W 72/0493* (2013.01); *H04W 76/27* (2018.02); *H04W 80/02* (2013.01)

(58) Field of Classification Search
CPC . H04W 72/0493; H04W 76/27; H04W 80/02; H04W 76/19; H04L 5/0053; H04L 5/0051; H04L 5/0092
See application file for complete search history.

(56) References Cited

U.S. PATENT DOCUMENTS

| | | | | |
|---|---|---|---|---|
| 2019/0387579 | A1* | 12/2019 | Pao | H04L 5/001 |
| 2020/0107352 | A1* | 4/2020 | Tsai | H04B 7/0691 |
| 2020/0107353 | A1* | 4/2020 | Jung | H04B 7/024 |
| 2022/0085938 | A1* | 3/2022 | Kang | H04L 5/00 |
| 2022/0104185 | A1* | 3/2022 | Moon | H04B 7/088 |

OTHER PUBLICATIONS

QUALCOMM Incorporated: "Beam Management for NR", 3GPP Draft; 3GPP TSG-RAN WG1 Meeting #95, R1-1813876 Beam Management for NR, 3rd Generation Partnership Project (3GPP), Mobile Competence Centre 550, Route Des Lucios; F-06921 Sophia-Antipolis Cedex; France, vol. RAN WG1, No. Spokane, US; Nov. 12, 2018-Nov. 16, 2018, Nov. 11, 2018 (Nov. 11, 2018), 5 Pages, XP051555786, URL: http://www.3gpp.org/ftp/Meetings%5F3GPP%5FSYNC/RAN1/Docs/RL%2DLBL3876%2Ezip [retrieved on Nov. 11, 2018], paragraph [0002] paragraph [0005].

* cited by examiner

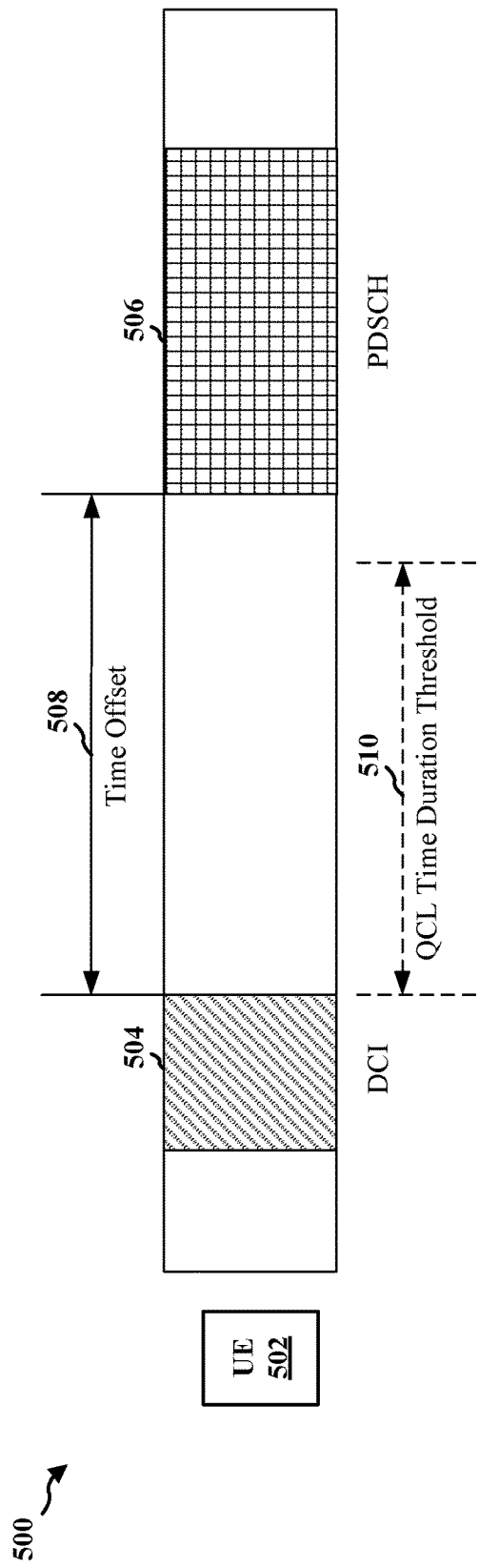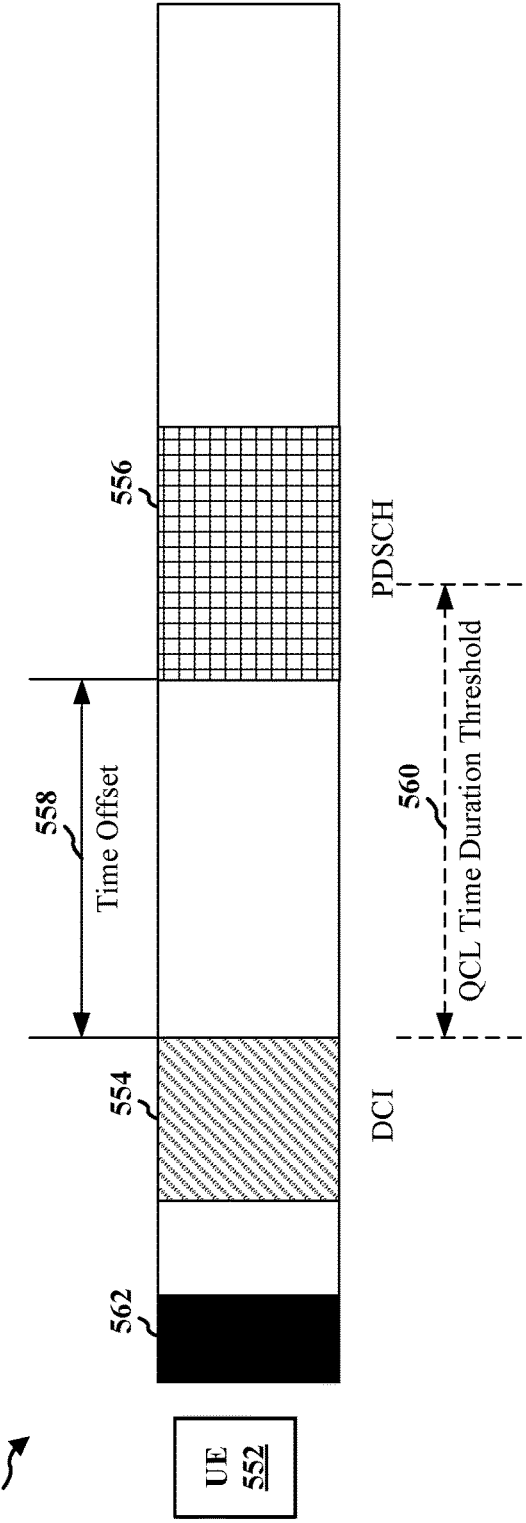

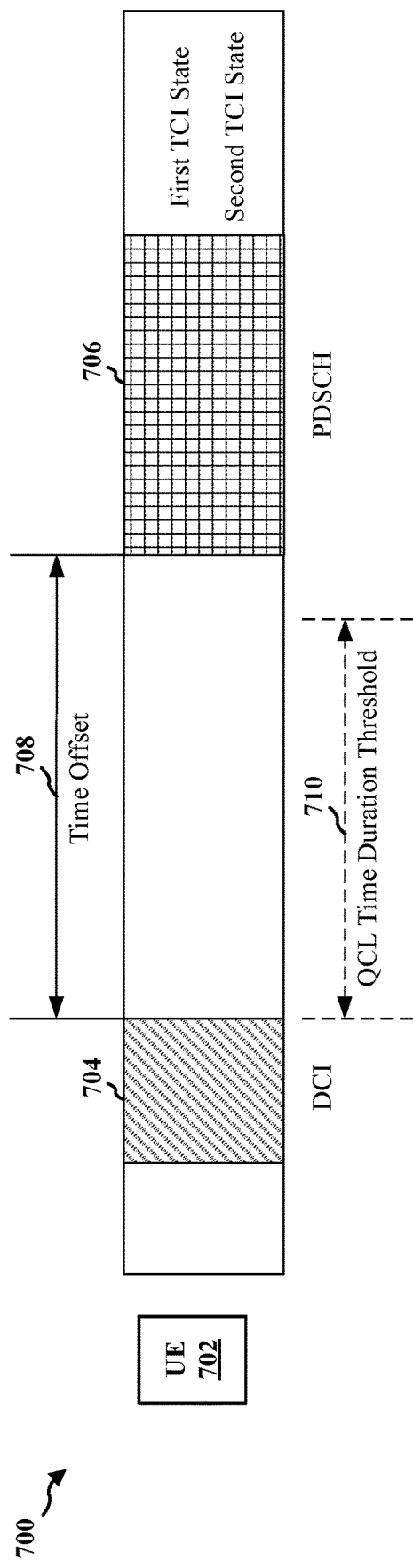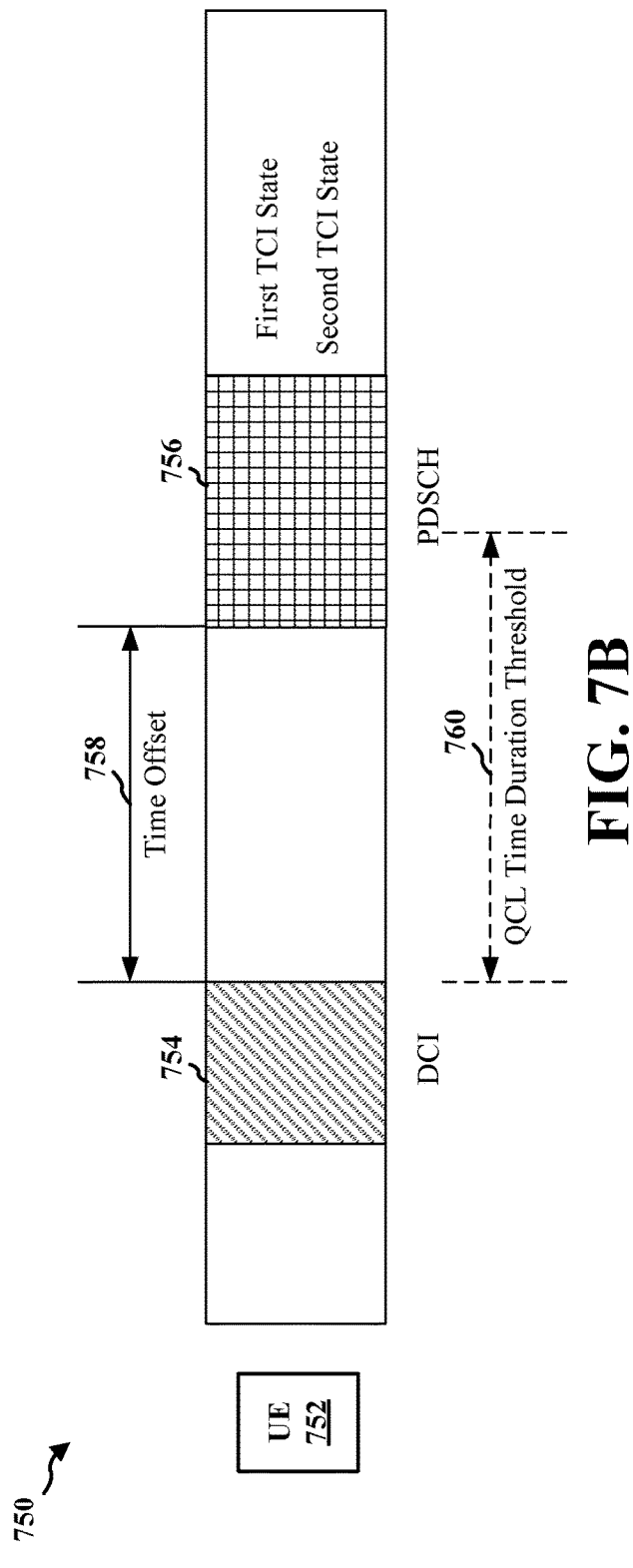

DEFAULT QUASI CO-LOCATION ASSUMPTION AFTER BEAM FAILURE RECOVERY FOR SINGLE-DOWNLINK CONTROL INFORMATION-BASED MULTIPLE TRANSMIT RECEIVE POINT COMMUNICATION

CROSS REFERENCE TO RELATED APPLICATION(S)

This application claims the benefit of U.S. Provisional Application Ser. No. 62/961,948, entitled "Default QCL Assumption After Beam Failure Recovery for Single-DCI Based Multiple-TRP," and filed on Jan. 16, 2020, which is expressly incorporated by reference herein in its entirety.

BACKGROUND

Technical Field

The present disclosure relates generally to communication systems, and more particularly, to wireless communication systems including a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). An example apparatus receives a message from a base station indicating at least one transmission configuration indicator (TCI) codepoint indicating a plurality of TCI states. The example apparatus receives a first transmission of a physical downlink shared channel (PDSCH) based on one or more first default quasi co-location (QCL) assumptions. The example apparatus also identifies a second beam in response to a beam failure detection (BFD) of one or more first beams. Additionally, the example apparatus receives, after identifying the second beam, a second transmission based on one or more second default QCL assumptions. At least one of the one or more first default QCL assumptions or the one or more second default QCL assumptions may be based on the message.

In another aspect of the disclosure, a method, a computer-readable medium, and an apparatus are provided for wireless communication of a base station. An example apparatus sends a message to a UE indicating at least one TCI codepoint indicating a plurality of TCI states. The example apparatus also transmits a first transmission of a PDSCH based on one or more first default QCL assumptions. Additionally, the example apparatus identifies a second beam in response to a beam failure of one or more first beams. The example apparatus also transmits, after identifying the second beam, a second transmission based on one or more second default QCL assumptions. At least one of the one or more first default QCL assumptions or the one or more second default QCL assumptions may be based on the message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A is a diagram illustrating an example of UE reception of DCI and PDSCH transmissions, in accordance with the teachings disclosed herein.

FIG. 5B is a diagram illustrating another example of UE reception of DCI and PDSCH transmissions, in accordance with the teachings disclosed herein.

FIG. 7A is a diagram illustrating another example of UE reception of DCI and PDSCH transmissions, in accordance with the teachings disclosed herein.

FIG. 7B is a diagram illustrating another example of UE reception of DCI and PDSCH transmissions, in accordance with the teachings disclosed herein.

DETAILED DESCRIPTION

Figure 1:
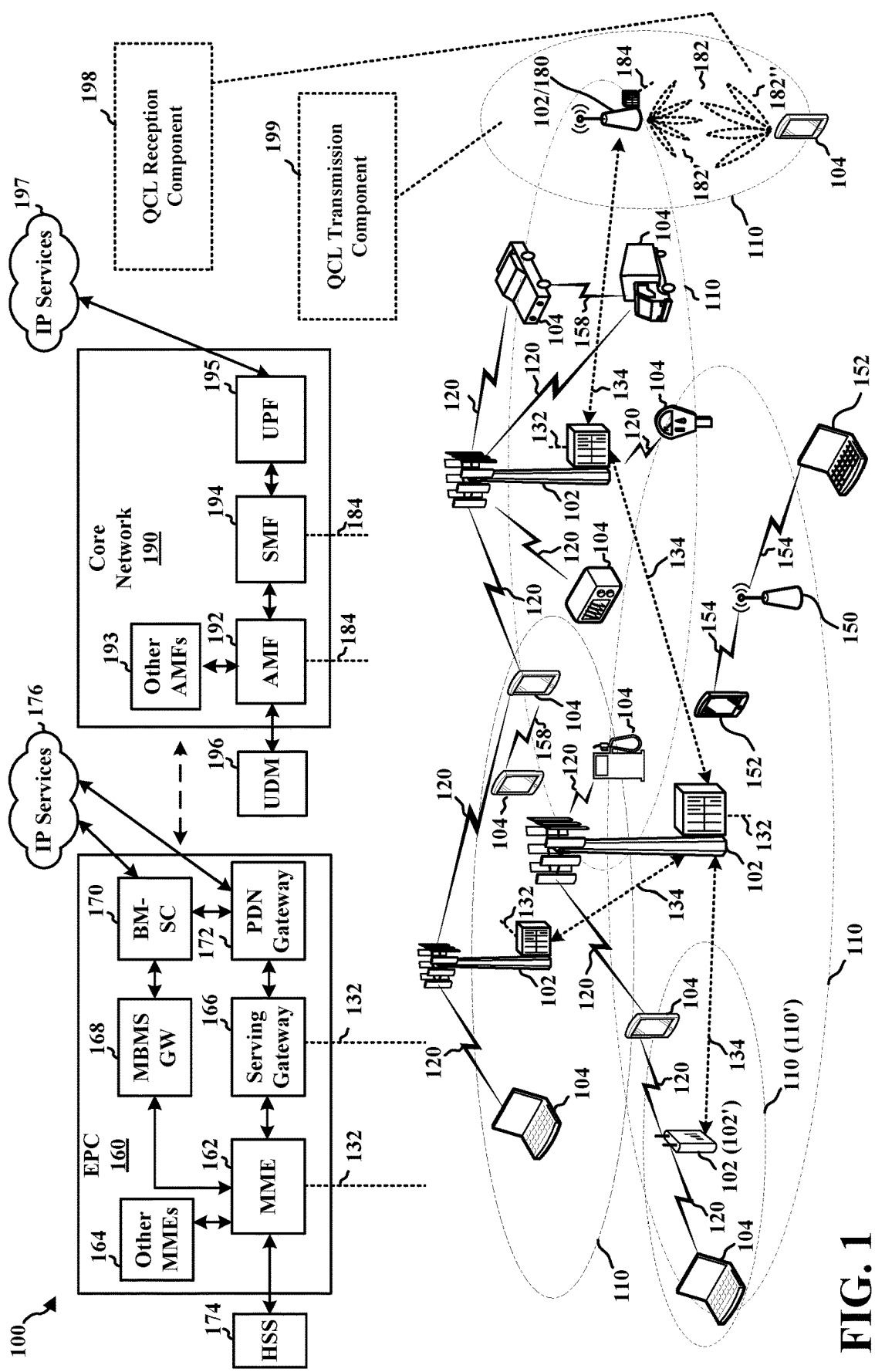
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

When a UE receives a demodulation reference signal (DM-RS) on a PDSCH, the UE may assume that the DM-RS port of the PDSCH is quasi co-located with one or more reference signals (RSs) received by the UE. For example, the RS and the DM-RS may be quasi co-located with respect to one or more of the following QCL parameters: Doppler shift, Doppler spread, average delay, delay spread, or spatial RX parameters. The QCL parameters and the associated RSs may be configured based on a set of TCI states activated for the UE in a MAC-CE, and the activated TCI states may be, in turn, mapped to TCI codepoints of a TCI field of DCI received by the UE. Thus, when a time offset between reception of a downlink (DL) DCI and the corresponding PDSCH is equal to or larger than a QCL time duration threshold, the UE may identify the TCI state (and, thus, the QCL parameters) for receiving the PDSCH based on the codepoint in the TCI field of the DCI. However, when the time offset is less than the threshold, the UE may not rely on the TCI field of the DCI, but instead may use a default assumption that the DM-RS ports of PDSCH of a serving cell are quasi co-located with the RS(s) based on the QCL parameter(s) used for physical downlink control channel (PDCCH) QCL indication of a control resource set (CORESET) associated with a monitored search space with the lowest CORESET identifier (ID) in a latest slot in which one or more CORESETs within an active bandwidth part (BWP) of the serving cell are monitored by the UE.

Generally, each codepoint corresponding to a TCI field value in the DCI may be mapped to one TCI state. However, in single-DCI based multiple transmit receive point (multiple-TRP) communication, each TCI codepoint may indicate one or two (or more) TCI states. In such cases where at least one TCI codepoint indicates two TCI states, if the time offset between reception of the DCI and the corresponding PDSCH is less than the QCL time duration threshold, the UE may replace the aforementioned default QCL assumption with a new default QCL assumption. In particular, the UE may apply a default assumption for the PDSCH based on the TCI states corresponding to a lowest codepoint of the TCI codepoints containing two different states indicating the TCI states. After applying the above-identified default QCL assumptions or indicated QCL assumptions in the TCI field to receive the PDSCH, the UE may receive data on the PDSCH from the base station using one or more beams.

Yet, in some situations, the beams may fail, for example, due to a poor radio link quality between the base station and the UE. In such cases, the UE may identify another beam to receive and transmit data with the base station by performing beam failure detection and recovery. For example, the UE may detect an occurrence of beam failure based on a set of beam failure detection resources, and the UE may identify a new beam based on a selected RS index from a set of candidate beam resources with a reference signal received power (RSRP) that is above an RSRP threshold. As a result of the beam failure detection and recovery, the default QCL assumptions applied by the UE may change. For example, the UE may instead apply a default assumption that the same QCL parameters as the ones associated with the selected RS index from the set of candidate beam resources are to be used for PDCCH monitoring in a CORESET-0 and PDSCH reception. However, this change in default QCL assumptions may be inconsistent with single-DCI based multiple-TRP communication. For example, CORESET-0 may not be used for the default QCL assumption when at least one TCI codepoint indicates two TCI states as described above. In such cases, even if CORESET-0 is the CORESET monitored by the UE in a latest slot, the lowest codepoint indicating two TCI states may be the basis for the default QCL assumption, and not CORESET-0. Consequently, there may be confusion about which default QCL assumptions to apply after BFR.

The present disclosure may improve the QCL assumptions by providing default QCL assumptions for UEs and base stations to apply after identifying a new beam in response to beam failure detection for single-DCI based multiple-TRP communication. In a first aspect, the UE may continue to apply the default QCL assumption based on TCI states corresponding to the lowest codepoint among the TCI codepoints containing two different TCI states both before and after beam failure detection and recovery. In a second aspect, the UE may reset or change the default QCL assumption for PDSCH to at least one of: the lowest CORESET-ID in the latest monitored slot, the selected RS index during beam failure recovery, CORESET-0, or the first TCI state corresponding to the lowest TCI codepoint indicating two TCI states. Additionally, aspects of the present disclosure provide default QCL assumptions for UEs and base stations to apply during beam failure recovery for single-DCI based multiple-TRP communication when the UE is not configured with a set of beam failure detection resources. In particular, aspects of the present disclosure allow the UE to use the RS corresponding to the default QCL assumptions for PDSCH (e.g., associated with the TCI states corresponding to a lowest codepoint among the TCI codepoints containing two different TCI states) as the beam failure detection resources.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 including base stations 102 or 180 and UE 104.

In some examples, a wireless communication device, such as the UE 104, may be configured to manage one or more aspects of wireless communication by providing default QCL assumptions for a UE to apply after identifying a new beam from BFD/CBD/BFR for single-DCI based multiple-TRP communication. As an example, in FIG. 1, the UE 104 may include a QCL reception component 198 configured to receive a message from a base station indicating at least one TCI codepoint indicating a plurality of TCI states. The example QCL reception component 198 may also be configured to receive a first transmission of a PDSCH based on one or more first default QCL assumptions. Additionally, the example QCL reception component 198 may be configured to identify a second beam in response to a BFD of one or more first beams. The QCL reception component 198 may also be configured to receive, after identifying the second beam, a second transmission based on one or more second default QCL assumptions. In some examples, at least one of the one or more first default QCL assumptions or the one or more second default QCL assumptions may be based on the message.

Still referring to FIG. 1, in some examples, the base station 102/180 may be configured to manage one or more aspects of wireless communication by providing default QCL assumptions for base stations to apply after identifying a new beam from BFD/CBD/BFR for single-DCI multi-TRP communication. As an example, in FIG. 1, the base station 102/180 may include a QCL transmission component 199 configured to send a message to the UE 104 indicating at least one TCI codepoint indicating a plurality of TCI states. The example QCL transmission component 199 may also be configured to transmit a first transmission of a PDSCH based on one or more first default QCL assumptions. Additionally, the example QCL transmission component 199 may be configured to identify a second beam in response to a beam failure of one or more first beams. The example QCL transmission component 199 may also be configured to transmit, after identifying the second beam, a second transmission based on one or more second default QCL assumptions. In some examples, at least one of the one or more first default QCL assumptions or the one or more second default QCL assumptions may be based on the message.

Although the following description may be focused on 5G NR, the concepts described herein may be applicable to other similar areas, such as LTE, LTE-A, CDMA, GSM, and other wireless technologies.

Referring again to FIG. 1, the wireless communications system (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
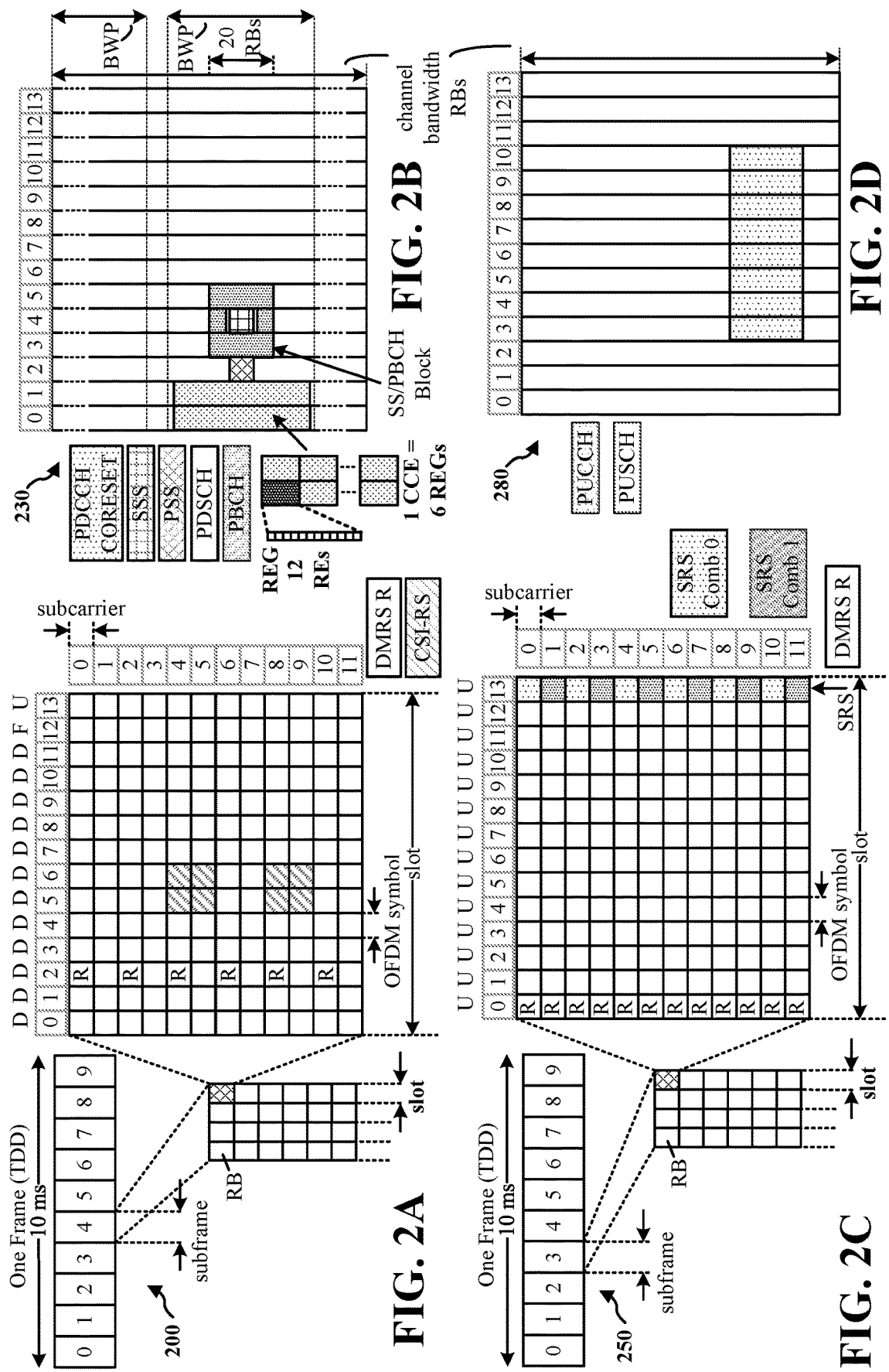
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
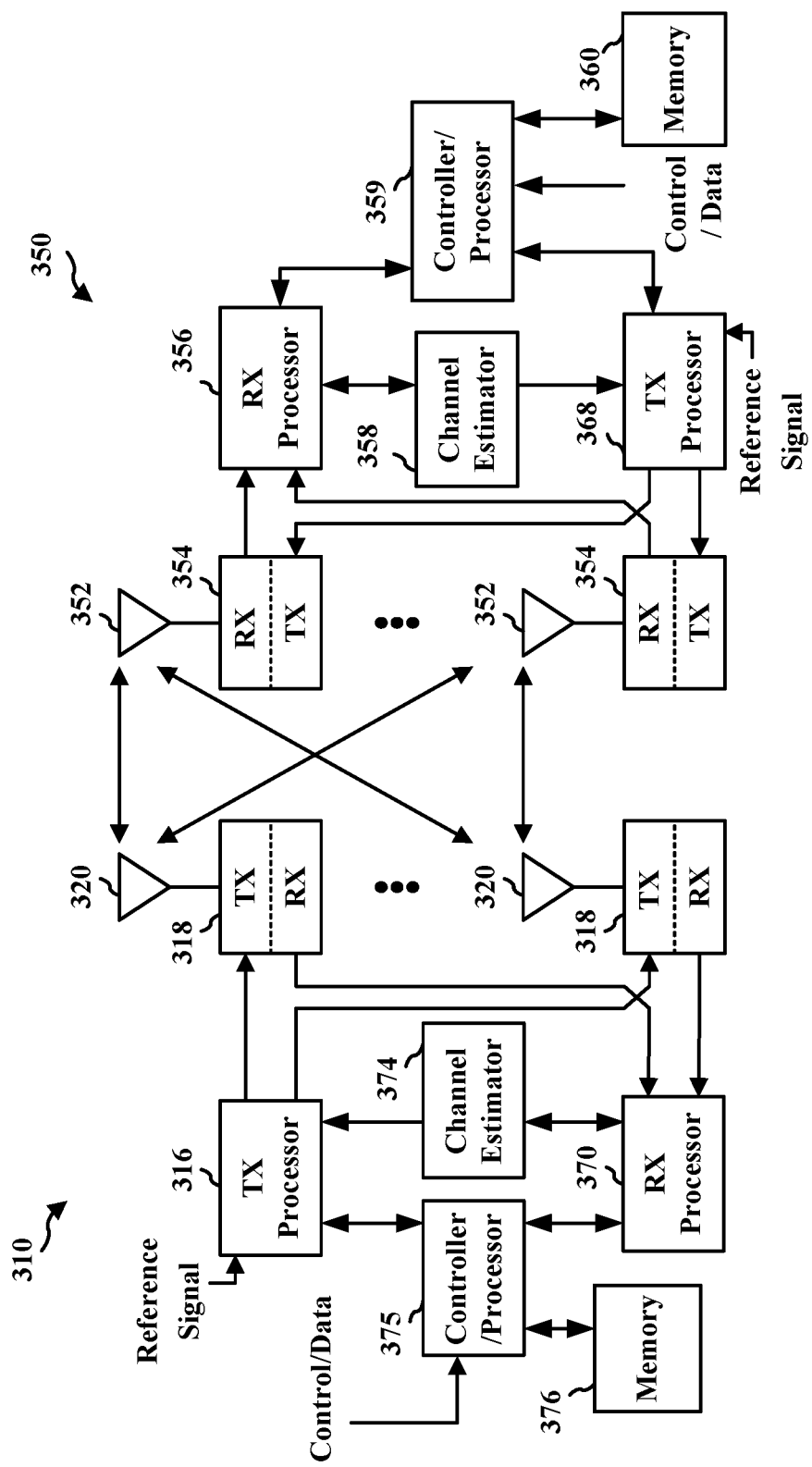
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor (e.g., a TX processor 316) and the receive (RX) processor (e.g., an RX processor 370) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to an RX processor 356. A TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by a channel estimator 358. The soft decisions are then decoded and deinterleaved to recover the data and control signals that were originally transmitted by the base station 310 on the physical channel. The data and control signals are then provided to a controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to the RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the QCL reception component 198 of FIG. 1.

At least one of the TX processor 316, the RX processor 370, and the controller/processor 375 may be configured to perform aspects in connection with the QCL transmission component 199 of FIG. 1.

Figure 4:
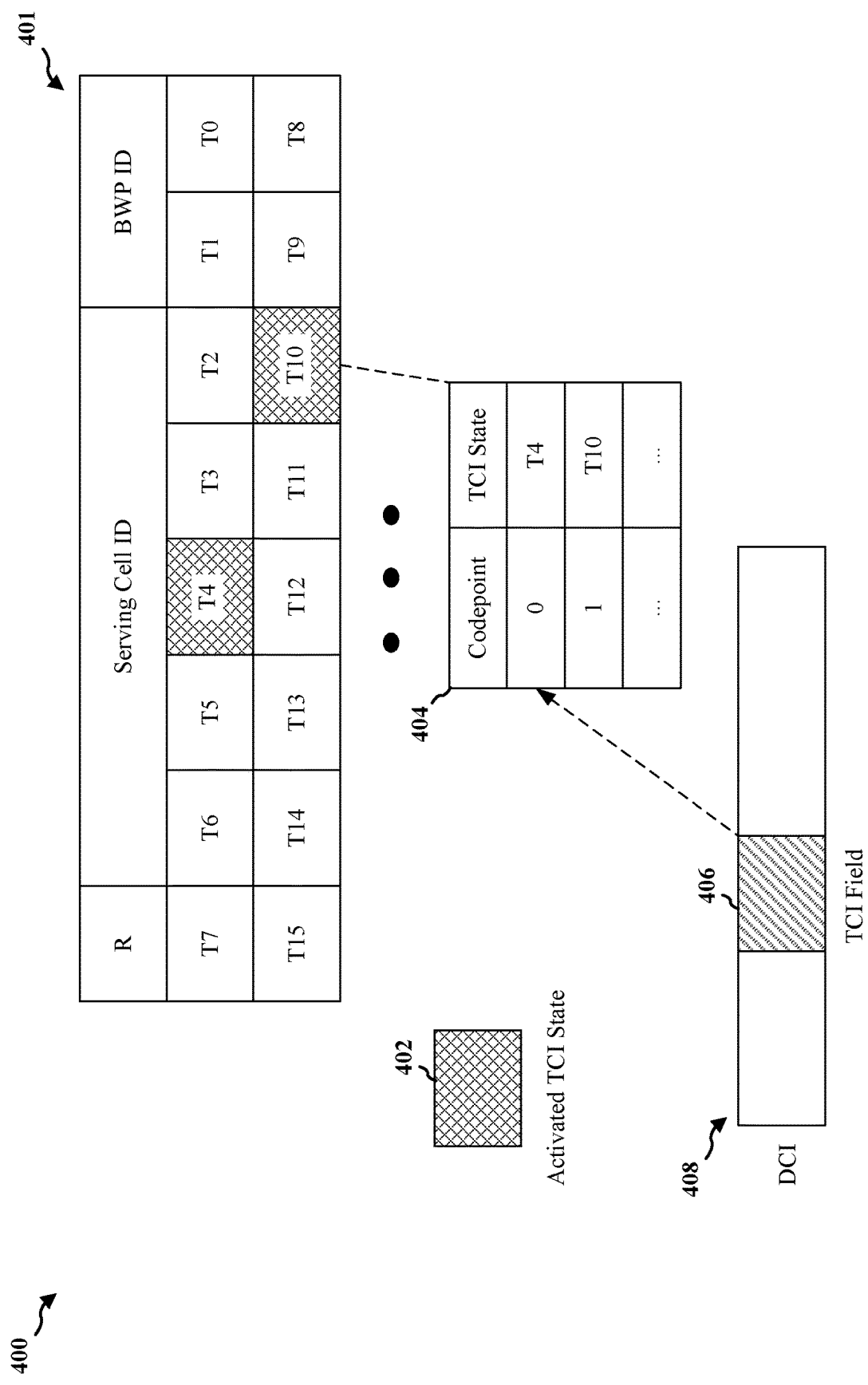
FIG. 4 is a diagram illustrating an example of a medium access control (MAC) control element (MAC-CE) to activate a set of TCI states for a UE, in accordance with the teachings disclosed herein.

FIG. 4 illustrates an example of a message 400 including a medium access control (MAC) control element (MAC-CE) to activate a set of TCI states that the base station may send to the UE, as disclosed herein. For example, the message 400 may include a TCI States Activation/Deactivation for UE-specific PDSCH MAC-CE 401. The example MAC-CE 401 includes a serving cell identifier ("Serving Cell ID") field, a bandwidth part identifier ("BWP ID") field, TCI state ("Ti") fields, and a reserved ("R") field. The Serving Cell ID field indicates the identity of the serving cell for which the MAC-CE 401 applies. The BWP ID field indicates a downlink BWP for which the MAC-CE 401 applies. The TCI state field indicates the activation/deactivation status of the respective TCI state. For example, a TCI state field may be set to a first value (e.g., a "0" value) to indicate that the respective TCI state is deactivated, and the TCI state field may be set to a second value (e.g. a "1" value") to indicate that the respective TCI state is activated. The reserved field indicates unused bits of the MAC-CE 401. In some examples, the one or more bits of a reserved field may be set to a value (e.g., a "0" value) to indicate that the field is unused.

The MAC-CE 401 indicates a set of activated TCI states 402 that are mapped to codepoints 404 of a TCI field 406 of DCI 408. For instance, FIG. 4 illustrates an example where TCI codepoint 0 is mapped to, or indicates, TCI state 4 (T4), TCI codepoint 1 is mapped to, or indicates, TCI state 10 (T10), and so forth. In some examples, the codepoints 404 may include a maximum quantity of TCI codepoints that are mapped to, or indicate, TCI states (e.g., for at most eight different codepoints). In the illustrated example of FIG. 4, the TCI field 406 of the DCI 408 is currently configured with the TCI codepoint 0, which maps to, or indicates, TCI state 4. However, the illustrated example of FIG. 4 is an example and other examples may include TCI codepoints that map to, or indicate, additional or alternative TCI states. In some examples, the MAC-CE 401 may include a CORESET pool identifier ("CORESET Pool ID") that indicates for which CORESET identifier (indicated by the CORESET Pool identifier field) that the mapping between the activated TCI states 402 and the codepoints 404 applies.

Each TCI state may be configured with one or more QCL parameters, such as Doppler shift, Doppler spread, average delay, delay spread, and spatial reception (Rx). The set of QCL parameters may be signaled as a QCL-type. The QCL-type may be associated with a combination (e.g., a set) of QCL relationships. For example, QCL-Type A may indicate QCL with respect to Doppler shift, Doppler spread, average delay, and delay spread, QCL-Type B may indicate QCL with respect to Doppler shift and Doppler spread, QCL-Type C may indicate QCL with respect to Doppler shift and average delay, and QCL-Type D may indicate QCL with respect to spatial Rx parameters. Each TCI state may, thus, be associated with a different QCL assumption. For example, a TCI state configured with QCL-Type A corresponding to a CSI-RS may indicate to the UE the QCL assumption that the DM-RS ports for the CSI-RS and a PDSCH share similar channel properties with respect to Doppler shift, Doppler spread, average delay, and delay spread. Similarly, a TCI state configured with QCL-Type D corresponding to a CSI-RS may indicate to the UE the QCL assumption that the DM-RS ports for the CSI-RS and a PDSCH share similar properties with respect to a spatial Rx parameter for beamforming. In one example with reference to FIG. 4, the TCI state 4 may be configured with QCL-Type A for one CSI-RS, while the TCI state 10 may be configured with QCL-Type D for another CSI-RS. However, the TCI states may be configured differently in other examples.

A UE receiving a DCI may identify a TCI state for a scheduled PDSCH depending on a time offset between reception of a downlink DCI and the corresponding PDSCH. If the time offset is equal to or larger than a threshold (e.g., a QCL time duration threshold "timeDurationForQCL"), the TCI field in the DCI indicates the TCI state for the scheduled PDSCH. For instance, FIG. 5A illustrates an example 500 of a UE 502 that receives a DCI 504 and a transmission on a PDSCH 506. As shown in FIG. 5A, a time offset 508 between reception of the DCI 504 and the PDSCH 506 is greater than or equal to a QCL time duration threshold 510. Given this time offset, the TCI field (e.g., the TCI field 406 of FIG. 4) in the DCI 504 indicates the TCI state for the PDSCH 506. The UE 502 may identify the QCL assumption based on the indicated TCI state, as described above with respect to FIG. 4. For instance, if the TCI field in DCI 504 indicates TCI codepoint 0 (corresponding in this example to TCI state 4 based on the codepoints 404 of the message 400), the UE 502 may receive the PDSCH 506 based on the QCL assumption that the DM-RS ports of a CSI-RS associated with the TCI state 4 and the PDSCH 506 share similar channel properties with respect to Doppler shift, Doppler spread, average delay, and delay spread. The QCL time duration threshold 510 may be configured based on a capability of the UE 502 reported to the base station. For instance, the QCL time duration threshold 510 may be 14 OFDM symbols or 28 OFDM symbols.

However, if the time offset 508 between the reception of the DCI 504 and the corresponding PDSCH 506 is less than the threshold (e.g., the QCL time duration threshold 510 (timeDurationForQCL) or another threshold), the UE 502 may, by default, assume that the DM-RS ports of the PDSCH 506 of a serving cell are quasi co-located with the RS(s) with respect to the QCL parameter(s) (e.g., the QCL-type) used for PDCCH QCL indication of a CORESET associated with a monitored search space with the lowest CORESET-ID in the latest slot in which one or more CORESETs within an active BWP of the serving cell are monitored by the UE. The PDCCH QCL indication of the CORESET (e.g., the TCI state of the CORESET) may be indicated, for example, by a TCI State Indication for UE-specific PDCCH MAC-CE for the CORESET. Thus, in an example default QCL assumption, if CORESET-0 is the CORESET monitored by the UE in the latest slot, the UE assumes that the TCI state associated with CORESET-0 indicates the TCI state for the PDSCH, as opposed to the TCI field in the DCI.

For instance, FIG. 5B illustrates an example 550 of a UE 552 that receives DCI 554 and a transmission on a PDSCH 556. As shown in FIG. 5B, a time offset 558 between reception of the DCI 554 and the PDSCH 556 is less than a QCL time duration threshold 560. Given this time offset, the default QCL assumption is applied, in which the UE 552 assumes that the TCI state associated with the CORESET with the lowest CORESET-ID in the latest monitored slot (e.g., CORESET-0) indicates the TCI state for the PDSCH 556. For instance, if CORESET-0 562 is associated with the TCI state 10 in the example codepoints 404 of the message 400 of FIG. 4, the UE 552 may receive the PDSCH 556 based on the default QCL assumption that the DM-RS ports of a CSI-RS associated with the TCI state 10 and the PDSCH 556 share similar channel properties with respect to a spatial Rx parameter for beamforming.

As described above, each codepoint corresponding to a TCI field value in the DCI may generally be mapped to one TCI state. However, in single-DCI based multiple-TRP communication, each TCI codepoint may indicate one or more TCI states. In single-DCI based multiple-TRP communication, the base station may transmit a single DCI to schedule data to be sent to the UE from multiple-TRPs over two PDSCHs (e.g., to facilitate spatial multiplexing or increase diversity). Thus, where two TRPs are transmitting data, one or more codepoints may indicate two TCI states corresponding to the PDSCH from both TRPs.

Figure 6:
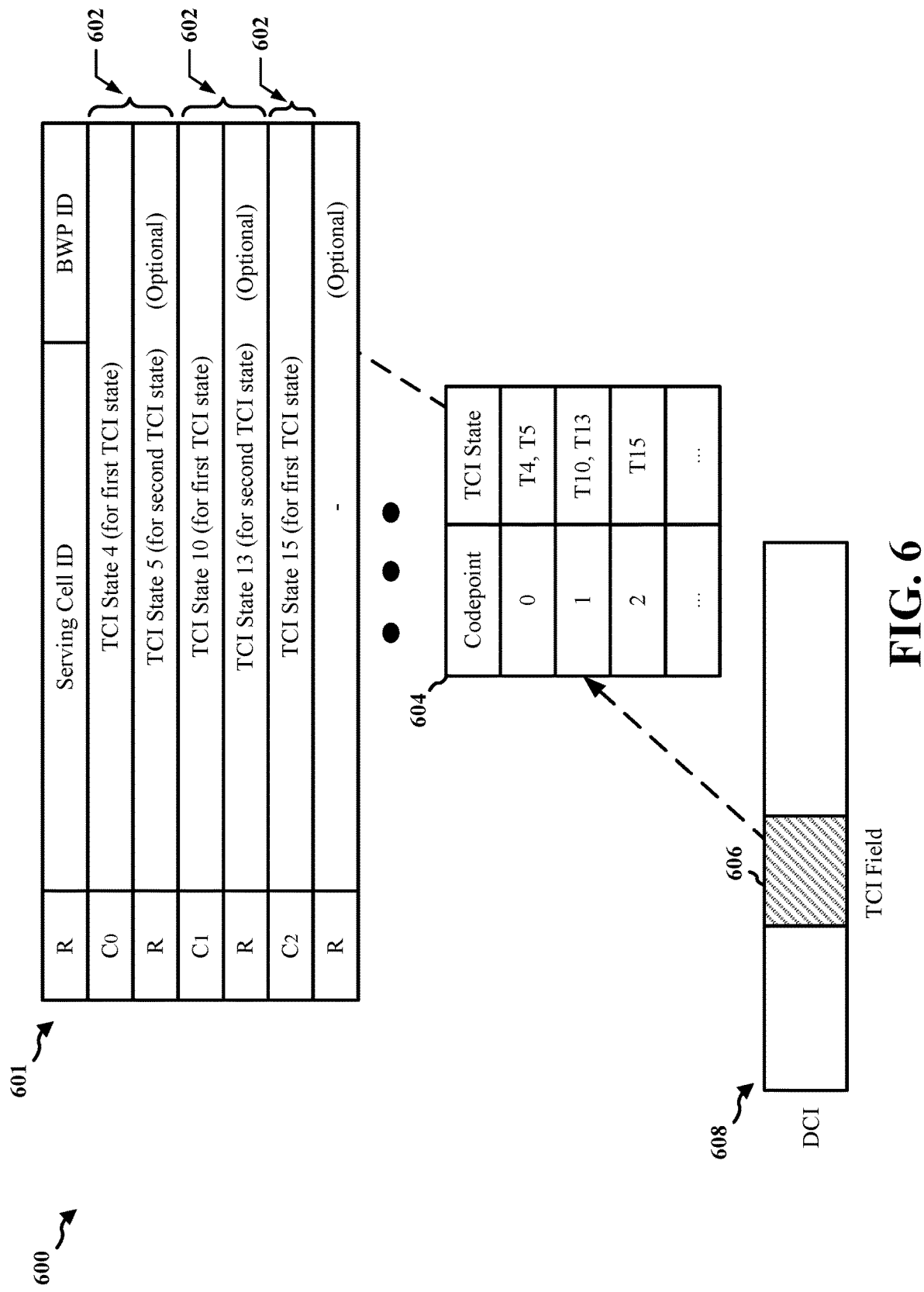
FIG. 6 is a diagram illustrating another example of a MAC-CE to activate a set of TCI states for the UE, in accordance with the teachings disclosed herein.

For example, referring to FIG. 6, a base station communicating with a UE based on single-DCI based multiple-TRP communication may send the UE a message 600 including a MAC-CE 601 to activate a set of TCI states. For example, the MAC-CE 601 may be a TCI States Activation/Deactivation for UE-specific PDSCH MAC-CE. Similar to the example of FIG. 4, the MAC-CE 601 of FIG. 6 includes a serving cell identifier ("Serving Cell ID") field, a bandwidth part identifier ("BWP ID") field, TCI state ("Ti") fields, and a reserved ("R") field. The MAC-CE 601 also includes codepoint ("Ci") fields that indicate a TCI codepoint for which the TCI state fields apply.

The example MAC-CE 601 of FIG. 6 indicates a set of activated TCI states 602 that are mapped to codepoints 604 of a TCI field 606 of DCI 608. However, unlike the example of FIG. 4, the MAC-CE 601 of FIG. 6 may map one or more TCI states (e.g., two TCI states) to each TCI codepoint of the codepoints 604. For instance, the codepoints 604 of FIG. 6 illustrates an example where a TCI codepoint 0 is mapped to, or indicates, TCI states 4 and 5 (T4 for a first TRP and T5 for a second TRP), a TCI codepoint 1 is mapped to, or indicates, TCI states 10 and 13, a TCI codepoint 2 is mapped to, or indicates, TCI state 15 (for one of the two TRPs), and so forth, up to a maximum number of active TCI states for the UE (e.g., eight different codepoints). In the illustrated example of FIG. 6, the MAC-CE 601 includes the codepoint fields and one or more corresponding rows that indicate the one or more TCI states that are mapped to the respective TCI codepoint. For example, the MAC-CE 601 includes a codepoint field "C0" corresponding to the TCI codepoint 0 and the associated activated TCI states 602 include two rows corresponding to the first TCI state (T4) and the second TCI state (T5) associated with the TCI codepoint 0. In a similar manner, the MAC-CE 601 includes a codepoint field "C1" corresponding to the TCI codepoint 1 and the associated activated TCI states 602 include two rows corresponding to the first TCI state (T10) and the second TCI state (T13) associated with the TCI codepoint 1. The MAC-CE 601 includes a codepoint field "C2" corresponding to the TCI codepoint 2 and the associated activated TCI states 602 include one row corresponding to the one TCI state (T15) associated with the TCI codepoint 2.

the TCI field 606 of DCI 608 is currently configured with the TCI codepoint 1, which maps to, or indicates, TCI states 10 and 13 (e.g., TCI state 10 for a first TRP and TCI state 13 for a second TRP). However, the illustrated example of FIG. 6 is an example, and other examples may include different TCI codepoints that map to, or indicate, additional or alternative combinations of TCI states (and TRPs). In some examples, the MAC-CE 601 may include a CORESET pool identifier ("CORESET Pool ID") that indicates for which CORESET identifier (indicated by the CORESET Pool identifier field) that the mapping between the activated TCI states 602 and the codepoints 604 applies.

A UE receiving a single DCI for multiple-TRP communication may identify a TCI state for a scheduled PDSCH from each TRP depending on a time offset between reception of a downlink DCI and the corresponding PDSCH(s). If the time offset is equal to or larger than a threshold (e.g., a QCL time duration threshold "timeDurationForQCL"), the TCI field in the DCI indicates the TCI state for the scheduled PDSCH as described in connection with FIG. 5A. For instance, FIG. 7A illustrates an example 700 of a UE 702 that receives DCI 704 and a first transmission on a PDSCH 706 (e.g., a first layer, RB(s), or symbol(s) of a PDSCH) from one TRP of a base station and a second transmission on the PDSCH 706 (e.g., a second layer, RB(s), or symbol(s) of the PDSCH) from another TRP of the base station. As shown in FIG. 7A, a time offset 708 between reception of the DCI 704 and the PDSCH 706 is greater than or equal to a QCL time duration threshold 710. Given this time offset, the TCI field in DCI 704 (e.g., the TCI field 406 of FIG. 4) indicates the TCI state(s) for the PDSCH 706. The UE 702 may identify the QCL assumption based on the indicated TCI state(s), as described with respect to FIG. 4. For example, if the TCI field in the DCI 704 indicates codepoint 1 (corresponding in this example to TCI states 10 and 13 based on the codepoints 604 of the message 600), the UE 702 may receive the first transmission of PDSCH 706 based on the QCL assumption that the DM-RS ports of a CSI-RS associated with the TCI state 10 and the PDSCH 706 share similar channel properties with respect to a configured QCL type for the TCI state 10. The UE 702 may receive the second transmission of PDSCH 706 based on the QCL assumption that the DM-RS ports of a CSI-RS associated with the TCI state 13 and the PDSCH 706 share similar channel properties with respect to a configured QCL type for the TCI state 13.

However, if the time offset 708 between the reception of the DCI 704 and the corresponding PDSCH(s) 706 is less than the threshold (e.g., the QCL time duration threshold 710 (timeDurationForQCL)) and at least one TCI codepoint indicates two TCI states, the UE 702 may, by default, assume that the TCI states corresponding to the lowest codepoint of the TCI codepoints containing two different states indicate the TCI states for the PDSCH 706. For instance, referring to the example of FIG. 6, the TCI codepoint 0 may be configured to be the lowest codepoint (index) of the TCI codepoints 604 indicating two different TCI states (e.g., the TCI states 4 and 5). Thus, in an example default QCL assumption, the UE 702 may assume that the TCI states associated with the TCI codepoint 0 (e.g., the TCI states 4 and 5) indicate the TCI states for the PDSCH 706, as opposed to the TCI field in the DCI 704. This default QCL assumption for single-DCI based multiple-TRP communication may replace the aforementioned default QCL assumption for single-TRP communication relating to the lowest CORESET-ID in the latest monitored slot.

For instance, FIG. 7B illustrates an example 750 of a UE 752 that receives DCI 754 and a first transmission on a PDSCH 756 (e.g., a first layer, RB(s), or symbol(s) of a PDSCH) from one TRP of a base station and a second transmission on the PDSCH 756 (e.g., a second layer, RB(s), or symbol(s) of the PDSCH) from another TRP of the base station. As shown in FIG. 7B, a time offset 758 between reception of the DCI 754 and the PDSCH 756 is less than a QCL time duration threshold 760. Given this time offset, the default QCL assumption is applied, in which the UE 752 assumes that the TCI states associated with the lowest codepoint of the codepoints indicating two TCI states (e.g., the codepoint 0 mapping to the TCI states 4 and 5) indicate the TCI states for the PDSCH 756. As a result, the UE 752 may receive the first transmission of PDSCH 756 based on the QCL assumption that the DM-RS ports of a CSI-RS associated with the TCI state 4 and the PDSCH 756 share similar channel properties with respect to a spatial Rx parameter for beamforming (e.g., a QCL-Type D relationship). The UE 752 may receive the second transmission of PDSCH 756 based on the QCL assumption that the DM-RS ports of a CSI-RS associated with the TCI state 5 and the PDSCH 756 share similar channel properties with respect to spatial Rx parameter for beamforming (e.g., a QCL-Type D relationship).

After applying the above-identified default QCL assumptions or indicated QCL assumptions in the TCI field to receive PDSCH, the UE may receive data on the PDSCH from the base station using one or more beams. However, in some situations, the beams may fail, for example, due to poor radio link quality between the base station and the UE. In such cases, the UE may identify another beam to receive and transmit data by performing a beam failure detection and recovery procedure, as described herein.

In BFD, the UE may be provided with a set of beam failure detection resources such as a set of periodic CSI-RS resource configuration indexes by an RRC configured, higher layer parameter (e.g., a "failureDetectionResources" or another name). Alternatively, if the UE is not provided with this higher layer parameter, the UE may use the resource indexes with the same values as the RS indexes in the RS sets indicated by the active TCI states for respective CORESETs used for monitoring PDCCH as the beam failure detection resources. The set of periodic CSI-RS resource configuration indexes may include up to two RS indexes for a single port RS, and if there are two RS indexes in an active TCI state, the set of beam failure detection resources may include RS indexes with a QCL-Type D configuration for the corresponding TCI state. The physical layer in the UE assesses the radio link quality according to the set of beam failure detection resources against a threshold (e.g., a "Qout" or another name), and when the radio link quality for the corresponding resource configurations in the set is worse than the threshold, the physical layer in the UE provides an indication of beam failure to higher layers.

In response to a BFD occurrence, the UE may perform candidate beam detection (CBD) to identify another beam. When performing CBD, the UE may be provided with a set of candidate beam resources, such as a set of periodic CSI-RS resource configuration indexes and/or synchronization signal (SS)/physical broadcast channel (PBCH) block indexes by an RRC configured, higher layer parameter (e.g., a "candidate Beam RS List" or another name). For example, up to 16 resources may be configured that each correspond to a random access channel (RACH) preamble index (e.g., a "ra-preamble-index" or another name) for RACH transmission. Upon request from higher layers, the UE provides the periodic CSI-RS configuration indexes and/or SS/PBCH block indexes from the set of candidate beam resources and corresponding RSRP measurements that are larger than or equal to a configurable RSRP threshold (e.g., a "Qin" or another name). The UE then initiates contention-free random access procedures based on the random access resource (e.g., ra-preamble-index) associated with a selected RS index (e.g., a "qnew" or another name) from the candidate beam resources whose RSRP is above the RSRP threshold.

To complete the beam failure recovery (BFR) procedure, the UE sends a contention-free random access preamble for a BFR request to the base station, and monitors the PDCCH for a BFR random access response (RAR) to the beam failure recovery request while a random access response window (e.g., a "ra-ResponseWindow" or another name) is running. That is, for a PRACH transmission in slot n and according to antenna port QCL parameters associated with the selected RS index (qnew), the UE monitors PDCCH in a search space set provided by a higher layer parameter (e.g., a "recoverySearchSpaceID" or another name) for detection of a DCI format with a cyclic redundancy check (CRC) scrambled by a cell radio network temporary identifier (C-RNTI) or a modulation coding scheme C-RNTI (MCS-C-RNTI) starting from slot n+4 within a window configured by another higher layer parameter, such as a beam failure recovery configuration parameter (e.g., a "BeamFailureRecoveryConfig" or another name). If the UE is provided with a CORESET through a link to a search space set provided by the aforementioned higher layer parameter for a recovery search space (e.g., a "recoverySearchSpaceID") for monitoring PDCCH in the CORESET, the UE does not expect to be provided another search space set for monitoring PDCCH in the CORESET associated with the search space set provided by that higher layer parameter (e.g., the CORESET associated with search space set provided by this higher layer parameter (recoverySearchSpaceID) may not be used for other search space sets). Once the UE receives the PDCCH in the BFR RAR within the window, the BFR procedure is completed, and the UE may communicate with the base station based on the newly identified beam.

As a result of the beam failure detection and recovery procedure, the default QCL assumptions applied by the UE may change. In one example, for PDCCH monitoring and for corresponding PDSCH reception, the UE may assume the same antenna port QCL parameters as the ones associated with the selected RS index from the set of candidate beam resources (e.g., qnew) until the UE receives, by higher layers, an activation for a TCI state (e.g., in a MAC-CE) or any of the parameters for TCI states for PDCCH, such as "TCI-StatesPDCCH-ToAddlist" and/or "TCI-States PDCCH-ToReleaseList." The UE may receive the parameters for the TCI states for PDCCH via an RRC configuration for a CORESET. In another example, for CORESET-0, after 28 symbols from a last symbol of a first PDCCH reception in a search space set provided by a higher layer parameter for a recovery search space (e.g., a "recoverySearchSpaceID") where the UE detects a DCI format with a CRC scrambled by C-RNTI or MCS-C-RNTI, the UE assumes the same QCL parameters as the ones associated with the selected RS index (e.g., "qnew") for PDCCH monitoring in a CORESET with index 0. In some examples, CORESET-0 may be different than the CORESET associated with the search space set provided by the higher layer recovery search space identifier parameter.

However, this change in default QCL assumptions after BFR may be inconsistent with the default QCL assumption for single-DCI based multiple-TRP communication. For example, CORESET-0 may not be used for the default QCL assumption when at least one TCI codepoint indicates two TCI states, as described above in connection with FIG. 6. In such case, even if CORESET-0 is the CORESET monitored by the UE in a latest slot, the lowest codepoint indicating two TCI states may be the basis for the default QCL assumption and not CORESET-0. Consequently, there may be confusion about which default QCL assumptions to apply after BFR. Therefore, it may be helpful to clarify the default QCL assumptions before and after BFD/CBD/BFR for single-DCI based multiple-TRP communication.

The present disclosure provides default QCL assumptions for UEs and base stations to apply after identifying a new beam from BFD/CBD/BFR for single-DCI based multiple-TRP communication. The UE may determine an occurrence of single-DCI based multiple-TRP communication, for example, when the UE receives a MAC-CE for PDSCH TCI state activation indicating at least one TCI codepoint indicating two TCI states (e.g., the codepoints 604 of the message 600 in FIG. 6). In a first aspect, the UE may continue to use the default QCL assumption based on TCI states corresponding to the lowest codepoint among the TCI codepoints containing two different states, as described above with respect to FIG. 7B, both before and after BFD or BFR. In a second aspect, the UE may reset or change the default QCL assumption for PDSCH. For example, the new default QCL assumption for PDSCH after BFD/BFR may be based on at least one of: a TCI state or QCL assumption of the CORESET associated with a monitored search space with the lowest CORESET-ID in the latest slot in which one or more CORESETs within the active BWP of the serving cell are monitored by the UE; a QCL assumption associated with an RS index (e.g., qnew) corresponding to the selected RS index during BFR; a QCL assumption of CORESET-0; or a first TCI state corresponding to a lowest TCI codepoint indicating two TCI states.

The present disclosure also provides default QCL assumptions for UEs and base stations to apply during BFR for single-DCI based multiple-TRP communication when the UE is not configured with a set of beam failure detection resources. As above, the UE may determine an occurrence of single-DCI based multiple-TRP communication, for example, when the UE receives a MAC-CE for PDSCH TCI state activation indicating at least one TCI codepoint indicating two TCI states (e.g., the codepoints 604 of the message 600 in FIG. 6). The UE may use the RS corresponding to the default QCL assumptions for PDSCH (i.e., associated with the TCI states corresponding to a lowest codepoint among the TCI codepoints containing two different TCI states) as the beam failure detection resources. For example, if the UE is not provided with the higher layer parameters about failure detection resources (failureDetectionResources) for BFD or radio link monitoring (RLM), the UE may use the RS associated with the TCI states corresponding to the lowest codepoint for BFR or RLM, as opposed to the RS sets indicated by the active TCI states for respective CORESETs used for monitoring PDCCH.

Figure 8:
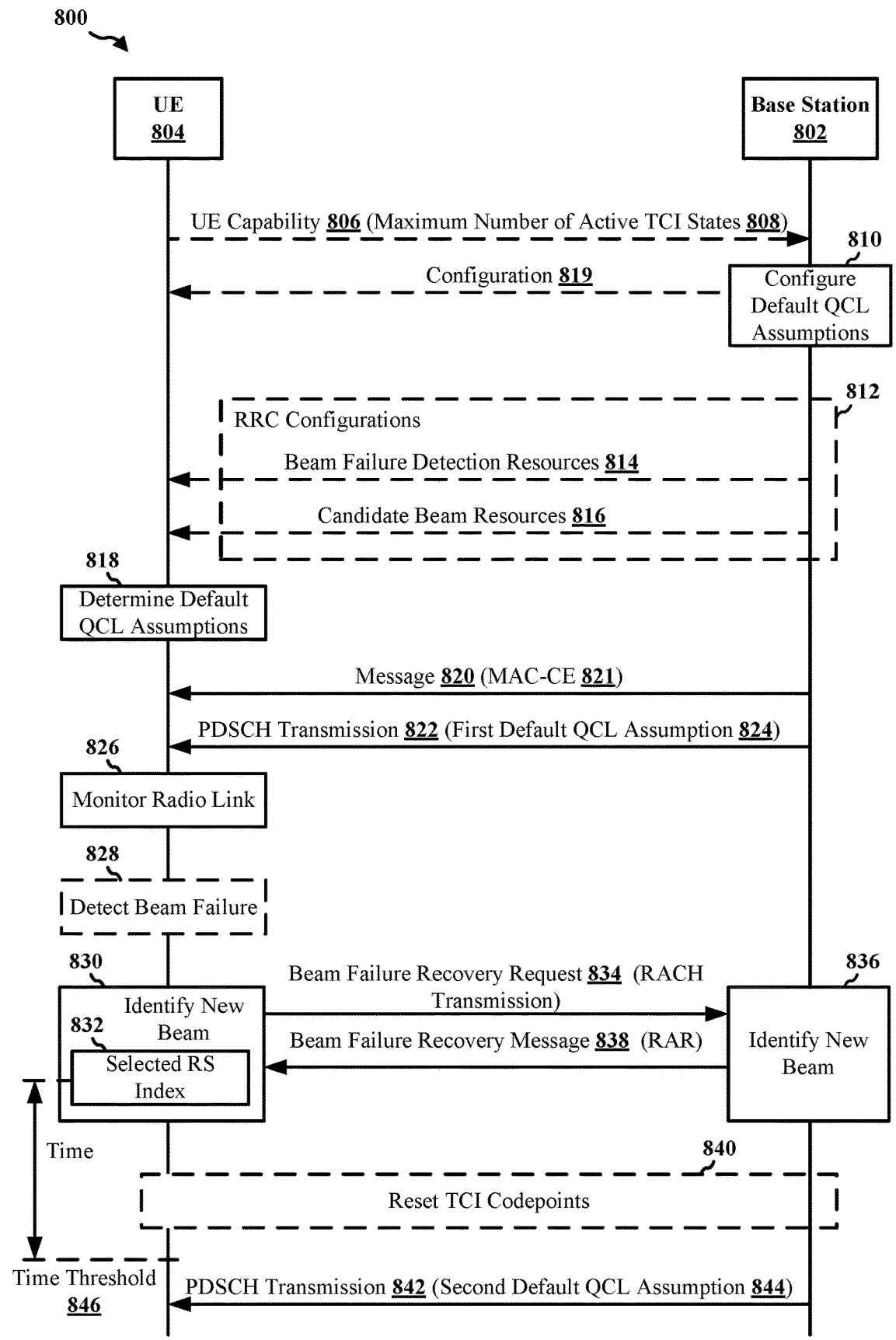
FIG. 8 is an example communication flow between a base station and a UE, in accordance with the teachings disclosed herein.

FIG. 8 illustrates an example communication flow 800 between a base station 802 and a UE 804, as presented herein. In the illustrated example, the communication flow 800 facilitates default QCL assumption after an occurrence of beam failure recovery when performing single-DCI based multiple-TRP communication. Aspects of the base station 802 may be implemented by the base station 102/180 of FIG. 1 and/or the base station 310 of FIG. 3. Aspects of the UE 804 may be implemented by the UE 104 of FIG. 1, the UE 350 of FIG. 3, the UE 502 of FIG. 5A, the UE 552 of FIG. 5B, the UE 702 of FIG. 7A, and/or the UE 752 of FIG. 7B. Although not shown in the illustrated example of FIG. 8, it may be appreciated that in additional or alternative examples, the base station 802 may be in communication with one or more other base stations or UEs, and/or the UE 804 may be in communication with one or more other base stations or UEs.

In the illustrated example, the UE 804 may transmit a UE capability information message to the base station 802 indicating UE capability 806 information of the UE 804. In some examples, the UE 804 may send the UE capability information message during an initial registration. The UE capability 806 may include a parameter indicating a maximum number of active TCI states 808 supported by the UE (e.g., a "maxNumberActiveTCI-PerBWP" or another parameter name). For example, the UE 804 may indicate to the base station 802 that the UE 804 supports a maximum of eight active TCI states.

At 810, the base station 802 may configure default QCL assumptions to be applied by both the base station 802 and the UE 804 before and after beam failure recovery for single-DCI based multiple-TRP communication. For example, the base station 802 may configure one or more first default QCL assumptions that are applied before beam failure detection and recovery. For instance, as described with respect to FIGS. 6 and 7B, the base station 802 may configure the UE 804 (e.g., via a configuration 819) to assume, by default, when a time offset 758 between the reception of the DCI 754 and the corresponding PDSCH 756 is less than a QCL time duration threshold 760 (e.g., the timeDurationForQCL threshold) and at least one TCI codepoint 604 indicates two TCI states 602, that the TCI states corresponding to a lowest codepoint of the TCI codepoints containing two different states (e.g., the TCI states 4 and 5 corresponding to the codepoint 0 in the example of FIG. 6) indicate the TCI states for the PDSCH. Thus, for the one or more first default QCL assumptions, the base station 802 may configure the UE 804 to assume that one or more reference signals (e.g., a CSI-RS) associated with the TCI states indicated by the lowest codepoint of the message 600 and the PDSCH DM-RS share similar channel properties with respect to one or more QCL-types (e.g., spatial Rx parameter for beamforming when the QCL-Type D relationship is applicable).

Moreover, the base station 802 may configure one or more second QCL assumptions that are applied when the UE 804 receives a MAC-CE for PDSCH TCI state activation indicating at least one TCI codepoint that indicates two TCI states (e.g., the message 600 of FIG. 6) and after the UE 804 performs beam failure detection and recovery (e.g., the BFD, CBD, and BFR procedures described above). In a first option, the base station 802 may configure the one or more second default QCL assumptions to match the one or more first default QCL assumptions. That is, the base station 802 may configure the UE 804 (e.g., via the configuration 819) to continue using the one or more first default QCL assumptions based on TCI states corresponding to the lowest codepoint among the TCI codepoints containing two different TCI states as described immediately above. Accordingly, in this first option, performing BFR does not change or reset the default QCL assumptions. For example, the UE 804 may still receive a PDSCH with two TCI states (e.g., when the time offset 758 between the reception of the DCI 754 and the corresponding PDSCH is less than the QCL time duration threshold 760) even after identifying a new beam. For example, referring to FIG. 7B, the UE 804 may continue to receive a first transmission on a PDSCH 756 (e.g., a first layer, RB(s), or symbol(s) of a PDSCH) from one TRP of a base station and a second transmission on the PDSCH 756 (e.g., a second layer, RB(s), or symbol(s) of the PDSCH) from another TRP of the base station based on respective default QCL assumptions that the DM-RS ports of a reference signal associated with each of the two TCI states (e.g., the TCI state 4 for a first TRP and the TCI state 5 for a second TRP in FIG. 6) and the PDSCH 756 share similar channel properties with respect to a corresponding QCL type.

In a second option, the base station 802 may configure the one or more second default QCL assumptions to be different than the one or more first default QCL assumptions. That is, the base station 802 may reset the default QCL assumptions to be applied for PDSCH after the UE 804 performs beam failure detection and recovery as described above. In a first example of the second option, the one or more second default QCL assumptions may be configured to be based on the default QCL assumptions relating to the lowest CORESET-ID in the latest monitored slot, as described above with respect to FIG. 5B. For example, referring to the single-DCI based multiple-TRP communication example of FIG. 7B, the base station 802 may configure the UE 804 (e.g., via the configuration 819) to, by default, assume, when the time offset 758 between the reception of the DL DCI 754 and the corresponding PDSCH 756 is less than the QCL time duration threshold 760, that the DM-RS ports of the PDSCH 756 are quasi co-located with the RS(s) with respect to the QCL parameter(s) used for PDCCH quasi co-location indication of a CORESET associated with a monitored search space with the lowest CORESET-ID in the latest slot in which one or more CORESETs within the active BWP of the serving cell are monitored by the UE. Thus, for the one or more second default QCL assumptions, the base station 802 may configure the UE 804 to assume that the TCI state associated with the CORESET with the lowest CORESET-ID in the latest monitored slot indicates the TCI state for the PDSCH. For instance, if the UE 804 receives CORESET-0 562 (or another CORESET) in the latest monitored slot and that received CORESET is associated with the TCI state 15 in the example of FIG. 6 described above, the UE 804 may receive the PDSCH based on the default QCL assumption that the DM-RS ports of a reference signal associated with the TCI state 15 and the corresponding PDSCH share similar channel properties with respect to an associated QCL type.

In a second example of the second option, the one or more second default QCL assumptions may be configured to be based on a QCL assumption of a selected RS index for BFR. For example, referring to the single-DCI based multiple-TRP communication example of FIG. 7B, the base station 802 may configure the UE 804 (e.g., via the configuration 819) to, by default, assume, when the time offset 758 between the reception of the DL DCI 754 and the corresponding PDSCH 756 is less than the QCL time duration threshold 760, that the DM-RS ports of the PDSCH include the same antenna port QCL parameters as the ones associated with the selected RS index from the set of candidate beam resources (e.g., based on the qnew parameter). For instance, if the selected RS index for BFR is associated with QCL-Type D, the UE 804 may receive the PDSCH based on the default QCL assumption that the DM-RS ports of the RS corresponding to the selected RS index and the corresponding PDSCH share similar channel properties with respect to a spatial Rx parameter for beamforming.

In a third example of the second option, the one or more second default QCL assumptions may be configured to be based on a QCL assumption of CORESET-0. For example, referring to the single-DCI based multiple-TRP communication example of FIG. 7B, the base station 802 may configure the UE 804 (e.g., via the configuration 819) to, by default, assume, when the time offset 758 between the reception of the DL DCI 754 and the corresponding PDSCH 756 is less than the QCL time duration threshold 760, that the DM-RS ports of the PDSCH are quasi co-located with the RS(s) with respect to the QCL parameter(s) used for PDCCH quasi co-location indication of a CORESET-0. Thus, for the one or more second default QCL assumptions, the base station 802 may configure the UE 804 to assume that the TCI state associated with CORESET-0 (notwithstanding whether CORESET-0 is the CORESET with the lowest CORESET-ID in the latest monitored slot) indicates the TCI state for the PDSCH. For instance, if the CORESET-0 562 is associated with the TCI state 15 in the example of FIG. 6 described above, the UE 804 may receive the PDSCH based on the default QCL assumption that the DM-RS ports of a reference signal associated with the TCI state 15 and the corresponding PDSCH share similar channel properties with respect to an associated QCL type.

In a fourth example of the second option, the one or more default QCL assumptions may be configured to be based on a first TCI state corresponding to the lowest codepoint among the TCI codepoints containing two different TCI states. For example, referring to the single-DCI based multiple-TRP communication example of FIG. 7B, the base station 802 may configure the UE 804 (e.g., via the configuration 819) to, by default, assume that, when the time offset 758 between the reception of the DL DCI 754 and the corresponding PDSCH 756 is less than the QCL time duration threshold 760, that the first TCI state associated with the lowest codepoint of the codepoints indicating two TCI states (e.g., the TCI state 4 corresponding to the codepoint 0 in the example of FIG. 6) indicate the TCI states for the PDSCH 756. For instance, the UE 804 may receive either the first and second transmissions of PDSCH 756 based on the QCL assumption that the DM-RS ports of a reference signal associated with the TCI state 4 and the corresponding PDSCH share similar channel properties with respect to an associated QCL type.

Accordingly, in the aforementioned examples of the second option in which BFR changes or resets the default QCL assumptions, the UE 804 may no longer receive a PDSCH with two TCI states (e.g., when the time offset 758 between the reception of DL DCI 754 and the corresponding PDSCH 756 is less than the QCL time duration threshold 760) immediately after identifying a new beam. Rather, the UE 804 may receive a PDSCH with a single TCI state. For example, referring to FIG. 7B, the UE 804 may receive a first transmission on the PDSCH 756 (e.g., a first layer, RB(s), or symbol(s) of a PDSCH) from one TRP of a base station and a second transmission on the PDSCH 756 (e.g., a second layer, RB(s), or symbol(s) of the PDSCH) from another TRP of the base station according to at least one of the aforementioned examples based on the second default QCL assumption that the DM-RS ports of a reference signal associated with a single TCI state (e.g., the TCI state 4 for both TRPs in FIG. 6) and the corresponding PDSCH share similar channel properties with respect to a corresponding QCL type. However, once the UE 804 again receives a MAC-CE for PDSCH TCI state activation (e.g., the message 600 of FIG. 6) indicating at least one TCI codepoint indicating two TCI states, the UE 804 may again receive transmissions on PDSCH 756 based on one or more default QCL assumptions that the DM-RS ports of respective reference signals associated with the lowest codepoint of the two TCI states (e.g., the TCI state 4 for a first TRP and the TCI state 5 for a second TRP in FIG. 6) and the corresponding PDSCH share similar channel properties with respect to a corresponding QCL types.

The base station 802 may configure the one or more second default QCL assumptions according to one of the first option or the second option described above based on the information regarding the UE capability 806 received from the UE 804. The configuration 819 may be based on one or more parameters in the UE capability information message, such as the maximum number of active TCI states 808 supported by the UE 804, and/or based on other parameters for the UE capability 806. For example, the base station 802 may configure the one or more second default QCL assumptions to match the one or more first default QCL assumptions (the first option) if the maximum number of active TCI states 808 is greater than a threshold number (e.g., 2 active TCI states, 3 active TCI states, etc.). Similarly, the base station 802 may configure the one or more second default QCL assumptions to be different than the one or more first default QCL assumptions (according to any example of the second option) if the maximum number of active TCI states is less than or equal to the threshold number.

The base station 802 may also configure the one or more second default QCL assumptions according to one of the first option or the second option described above based on one or more RRC configurations 812 sent to the UE 804. For example, the configuration 819 may be based on one or more parameters in the one or more RRC configurations 812, such as beam failure detection resources 814 or candidate beam resources 816, which are configured for and transmitted to the UE 804 for BFD and CBD as described above, and/or based on other RRC parameters. For example, the base station 802 may configure a parameter in the RRC configurations 812 that uses a bit to indicate whether the UE 804 is to apply option 1 (e.g., via a "0" value) or option 2 (e.g., via a "1" value). In another example, the base station 802 may configure a parameter in the RRC configurations 812 that uses two bits to indicate which of different options is to be applied. For example, the base station 802 may indicate which of the four examples of option 2 described above that the UE 804 is to apply.

At 818, the UE 804 may determine the default QCL assumptions to be applied by both the base station 802 and the UE 804 before and after beam failure recovery for single-DCI based multiple-TRP communication. For example, the UE 804 may determine the one or more first default QCL assumptions described above that are applied before beam failure detection and recovery, and the UE 804 may determine the one or more second default QCL assumptions described above that are applied after beam failure detection and recovery. The UE 804 may determine the one or more first default QCL assumptions and second default QCL assumptions based on the configuration 819 received from the base station 802 (which is configured at 810). Alternatively, the one or more first default QCL assumptions and second default QCL assumptions may be preconfigured for the UE 804.

Additionally, the UE 804 may determine (at 818) the one or more second default QCL assumptions according to one of the first option or the second option based on the information regarding the UE capability 806 transmitted to the base station 802 and/or one or more RRC configurations 812 received from the base station 802, as described above. For example, the UE 804 may determine the one or more second default QCL assumptions to match (or be the same as) the one or more first default QCL assumptions (the first option) if the maximum number of active TCI states 808 is greater than a threshold number (e.g., 2 active TCI states, 3 active TCI states, etc.). Similarly, the UE 804 may determine the one or more second default QCL assumptions to be different than the one or more first default QCL assumptions (according to any example of the second option) if the maximum number of active TCI states is less than or equal to the threshold number.

In the illustrated example, the base station 802 transmits a message 820 that is received by the UE 804. The message 820 includes a MAC-CE 821. Referring to FIG. 6, the MAC-CE 821 may be a TCI States Activation/Deactivation for UE-specific PDSCHMAC-CE (e.g., the MAC-CE 601 of FIG. 6) that indicates the set of activated TCI states 602 mapped to the codepoints 604 of the TCI field 606 of the DCI 608. At least one codepoint may be mapped to a plurality of TCI states. For example, as illustrated in FIG. 6, the TCI codepoint 0 may be mapped to, or indicate, the TCI states 4 and 5 (T4 for a first TRP and T5 for a second TRP), the TCI codepoint 1 may be mapped to, or indicate, the TCI states 10 and 13, the TCI codepoint 2 may be mapped to, or indicate, the TCI state 15 (for one of the two TRPs), and so forth, up to the maximum number of active TCI states 808 for the UE 804.

The base station 802 transmits a PDSCH transmission 822 that is received by the UE 804. The PDSCH transmission 822 may be based on one or more first default QCL assumptions 824. For example, as described above, the UE 804 may assume that the DM-RS ports of one or more reference signals (e.g., a CSI-RS) associated with the TCI states indicated by the lowest codepoint of message 600 (e.g., the TCI states 4 and 5) and the corresponding PDSCH share similar channel properties with respect to one or more QCL-types (e.g., spatial Rx parameter for beamforming when the QCL-Type D relationship is applicable). Based on the assumption that the DM-RS ports of the CSI-RS associated with the TCI states 4 and 5 are quasi co-located with the corresponding PDSCH, the UE 804 may proceed to receive the PDSCH transmission 822. For instance, the UE 804 may use the same beam to receive the PDSCH transmission 822 as the CSI-RS.

At 826, the UE 804 may monitor the radio link between the UE 804 and the base station 802. When performing RLM (at 826), the UE 804 monitors the downlink radio link quality of the primary cell for the purpose of indicating out-of-sync/in-sync status to higher layers. The UE 804 may be configured with a set of resource indexes, through a corresponding set of higher layer parameters (e.g., Radio Link Monitoring RS, etc.). This set of resource indexes may be based on the beam failure detection resources 814 received from the base station 802. The UE 804 may continue performing RLM as the UE 804 receives data over PDSCH using one or more beams until BFD occurs (e.g., at 828) as described above.

At 828, the UE 804 may detect beam failure of the one or more beams used for communicating data with the base station 802. For example, the UE 804 may assess the radio link quality according to the set of beam failure detection resources 814 against a threshold (e.g., the Qout threshold), and provide an indication of beam failure to the higher layers of the UE 804 when the radio link quality for corresponding resource configurations in the set is worse than the threshold. However, if the UE 804 is not provided with the beam failure detection resources 814 (e.g., the base station 802 does not configure these resources for the UE 804 for performing RLM (at 826) or BFD (at 828)), the UE 804 may alternatively perform RLM or BFD using the reference signals corresponding to the one or more first default QCL assumptions 824 for PDSCH. That is, when the UE 804 receives the message 820 including a plurality of TCI codepoints indicating two TCI states (e.g., the message 600 in FIG. 6), the UE 804 may use the reference signals associated with the TCI states corresponding to the lowest codepoint of the plurality of TCI codepoints, as opposed to the RS sets indicated by the active TCI states of CORESETs monitored by the UE 804. For example, referring to FIG. 6, the TCI codepoint 0 may be mapped to the TCI states 4 and 5, the TCI codepoint 1 may be mapped to the TCI states 10 and 13, and the TCI codepoint 2 may be mapped to the TCI state 15. Therefore, even if a CORESET monitored by the UE 804 is associated with the TCI state 15, for example, the UE 804 may perform BFD or RLM using the reference signals associated with the TCI states corresponding to the lowest codepoint (e.g., the codepoint 0 mapping to the TCI states 4 and 5, as opposed to the TCI state 15 in the example), when the UE 804 is not provided beam failure detection resources 814.

At 830, after beam failure is detected at 828, the UE 804 may identify a new beam to communicate with the base station 802. For example, the UE 804 may perform CBD as described above to identify a selected RS index 832 from the candidate beam resources 816 received from the base station 802. The UE 804 may subsequently complete the BFR procedure by sending a beam failure recovery request 834 (e.g., a RACH transmission) to the base station 802 based on a RACH preamble index associated with the selected RS index. The base station 802 may identify the new beam at 832 based on the preamble index, and send a beam failure recovery message 838 (e.g., a random access response) to the UE 804. When the UE 804 receives the RAR, the BFR procedure is complete.

After performing BFR, the UE 804 may receive a subsequent PDSCH transmission 842 based on one or more second default QCL assumptions 844. The UE 804 may determine the one or more second default QCL assumptions 844 based on the configuration 819 described above, according to any of the aforementioned examples. For example, the UE 804 may assume that the DM-RS ports of one or more reference signals (e.g., CSI-RS) associated with the selected RS index 832 and the corresponding PDSCH share similar channel properties with respect to one or more QCL-types (e.g., the spatial Rx parameter for beamforming when QCL-Type D is applicable). Based on the assumption that the DM-RS ports of one or more reference signals are quasi co-located with the corresponding PDSCH, the UE 804 may proceed to receive the PDSCH. For instance, the UE 804 may use the same beam to receive the PDSCH transmission 842 as the CSI-RS. Alternatively, if the base station 802 configured the second default QCL assumptions according to any of the other aforementioned examples, the UE 804 may alternatively receive the PDSCH transmission 842 based on those other second default QCL assumptions, as described above. For instance, the UE 804 may assume that the DM-RS ports of one or more reference signals associated with the first TCI state in the lowest codepoint of the message 600 (e.g., the TCI state 4 corresponding to the codepoint 0) and the corresponding PDSCH share similar channel properties with respect to one or more QCL-types, that the DM-RS ports of one or more reference signals associated with the TCI state of the lowest CORESET-ID in the latest monitored slot and the corresponding PDSCH share similar channel properties with respect to one or more QCL-types, or that the DM-RS ports of one or more reference signals associated with the TCI state for CORESET-0 and the corresponding PDSCH share similar channel properties with respect to one or more QCL-types.

In some examples, at 840, after BFD/BFR, the UE 804 and the base station 802 may optionally reset the TCI codepoints activated in the message 820 before receiving PDSCH transmissions based on the one or more second default QCL assumptions 844. The TCI codepoints may be reset to indicate a different state or QCL assumption after the new beam is identified (e.g., at 830 by the UE 804 and at 836 by the base station 802). By resetting the TCI codepoints in addition to changing or resetting the default QCL assumptions, the activated TCI states for PDSCH (e.g., the TCI states corresponding to the codepoints 604 of FIG. 6) may be impacted or changed. Thus, the indicated QCL assumptions when the time offset 758 between the reception of the DCI 754 and the corresponding PDSCH 756 is greater than or equal to QCL time duration threshold 760 may also change.

In one option, the TCI codepoints may each be reset to indicate a QCL assumption of the selected RS index 832 for BFR. For example, referring to FIG. 6, the TCI field 606 may currently include codepoint 1, which is associated with the TCI states 10 and 13 (each corresponding to a different CSI-RS index in this example). Nevertheless, the UE 804 and the base station 802 may reset the codepoints 604 to each be associated with the CSI-RS index corresponding to the selected RS index 832 (e.g., the qnew parameter). Thus, irrespective of the value of the TCI field 606 (e.g., the codepoints 0 to 7), when the time offset 758 between the reception of the DCI 754 and the corresponding PDSCH 756 is greater than or equal to the QCL time duration threshold 760, the UE 804 and the base station 802 may assume that the DM-RS ports of the CSI-RS associated with the selected RS index 832 is quasi co-located with the corresponding PDSCH.

In another option, the TCI codepoints may each be reset to indicate a QCL assumption of CORESET-0. For example, referring to FIG. 6, the TCI field 606 may include a codepoint 1, which is associated with the TCI states 10 and 13 (each corresponding to a different CSI-RS index in this example). Nevertheless, the UE 804 and the base station 802 may reset the codepoints 604 to each be associated with the TCI state corresponding to the CORESET-0 562. For example, the CORESET-0 may be configured to be associated with the TCI state 15 in one example. Thus, irrespective of the value of the TCI field 606 (e.g., the codepoints 0 to 7), when the time offset 758 between the reception of the DCI 754 and the corresponding PDSCH is greater or equal to the QCL time duration threshold 760, the UE 804 and the base station 802 may assume that the DM-RS ports of the reference signal associated with the TCI state 15 is quasi co-located with the corresponding PDSCH.

In a further option, each TCI codepoint indicating a plurality of TCI states may be reset to indicate a single TCI state. For example, referring to the codepoints 604 of FIG. 6, the TCI codepoint 0 may map to, or indicate, the TCI states 4 and 5, the TCI codepoint 1 may map to, or indicate, the TCI states 10 and 13, the TCI codepoint 2 may map to, or indicate, the TCI state 15, and so forth, up to the maximum number of active TCI states 808 for the UE 804. Nevertheless, the UE 804 and the base station 802 may reset the codepoints 604 such that the codepoints indicating two TCI states (e.g., the codepoints 0 and 1, but not the code-point 2, for example) currently indicate the first of the two TCI states for each codepoint. For example, the codepoint 0 may be reset to indicate the TCI state 4, and the codepoint 1 may be reset to indicate the TCI state 10. Thus, when the time offset 758 between the reception of the DCI 754 and the corresponding PDSCH 756 is greater than or equal to the QCL time duration threshold 760, the UE 804 and the base station 802 may assume that the DM-RS ports of reference signal associated with a single TCI state indicated in the TCI field 606 is quasi co-located with the corresponding PDSCH.

The one or more second default QCL assumptions 844 for receiving the PDSCH transmission 842 and/or any TCI codepoints reset (at 840) may be configured to become effective immediately, or may be configured to become effective when a time after one of the BFD (at 828), the beam failure recovery request 834 (e.g., the RACH transmission), or the reception of the BFR message 838 exceeds a time threshold 846. For example, when the base station 802 sends the BFR message 838 to the UE 804 including PDCCH in a search space set provided by a higher layer parameter (e.g., the recoverySearchSpaceID parameter), as described above, the UE 804 and the base station 802 may apply the second default QCL assumptions and/or reset the TCI codepoints 28 symbols after a last symbol of the first PDCCH where the UE 804 detects a DCI format with CRC scrambled by a C-RNTI or MCS-C-RNTI of the UE 804 is received. While the aforementioned example indicates the time threshold 846 as 28 symbols, other numbers of symbols may be used.

Figure 9:
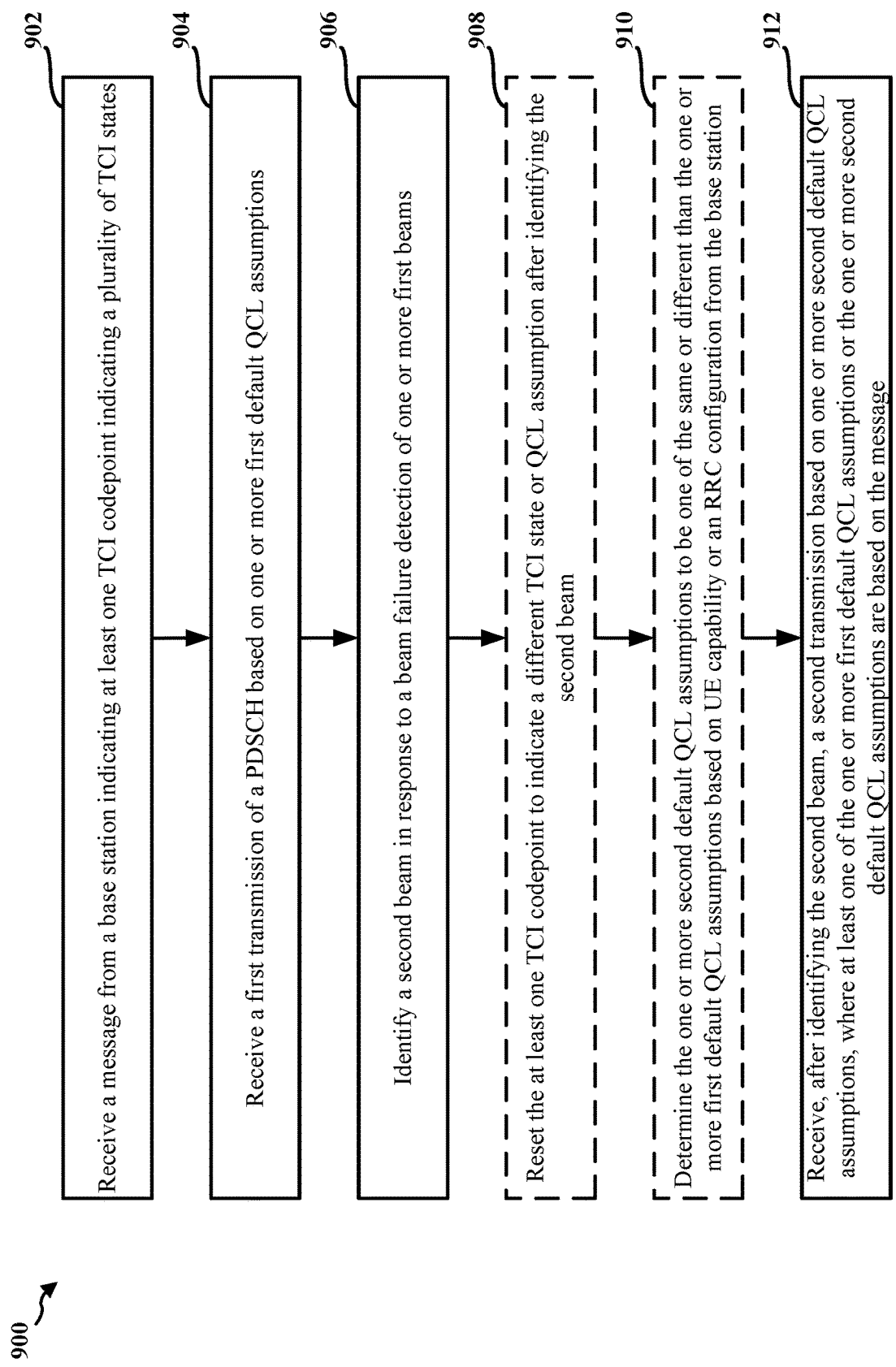
FIG. 9 is a flowchart of a method of wireless communication at a UE, in accordance with the teachings disclosed herein.

FIG. 9 is a flowchart 900 of a method of wireless communication. The method may be performed by a UE (e.g., the UE 104, the UE 350, the UE 502, the UE 552, the UE 702, the UE 752, the UE 804, and/or an apparatus 1002 of FIG. 10). Optional aspects are illustrated with a dashed line. The method provides default QCL assumptions for a UE to apply after identifying a new beam from BFD/CBD/BFR for single-DCI based multiple-TRP communication.

At 902, the UE receives a message from a base station indicating at least one TCI codepoint indicating a plurality of TCI states, as described in connection with the message 820 of FIG. 8. For example, 902 may be performed by a message component 1040 of the apparatus 1002 of FIG. 10. The message may comprise a PDSCH MAC-CE for TCI state activation. For example, referring to FIG. 8, the UE 804 may receive a message 820 from the base station 802 including a MAC-CE 821. Referring to FIG. 6, the MAC-CE may be a TCI States Activation/Deactivation for UE-specific PDSCH MAC-CE (e.g., the MAC-CE 601 of FIG. 6) which indicates the set of activated TCI states 602 that map to the codepoints 604 of the TCI field 606 of the DCI 608. At least one codepoint may be mapped to a plurality of TCI states. For example, as illustrated in FIG. 6, the TCI codepoint 0 maps to, or indicates, a plurality of TCI states 4 and 5 (e.g., the T4 for a first TRP and the T5 for a second TRP), the TCI codepoint 1 maps to, or indicates, a plurality of TCI states 10 and 13 (e.g., the T10 for a first TRP and the T13 for a second TRP), the TCI codepoint 2 maps to, or indicates, a single TCI state 15 (for one of the two TRPs), and so forth, up to the maximum number of active TCI states 808 for the UE 804.

At 904, the UE receives a first transmission of a PDSCH based on one or more first default QCL assumptions, as described in connection with the PDSCH transmission 822 of FIG. 8. For example, 904 may be performed by a first transmission component 1042 of the apparatus 1002 of FIG. 10. The one or more first default QCL assumptions may be effective when a time offset between DCI reception and PDSCH reception is less than a QCL time duration threshold. For example, referring to FIG. 8, the UE 804 may receive the PDSCH transmission 822 from the base station 802 based on one or more first default QCL assumptions 824. For instance, as described above with respect to FIGS. 6 and 7B, the UE may, by default, assume that the TCI states corresponding to a lowest codepoint of the TCI codepoints containing two different states (e.g., the TCI states 4 and 5 corresponding to the codepoint 0 in the above example) indicate the TCI states for the PDSCH. Thus, as described above, the UE may assume that DM-RS ports of one or more reference signals (e.g., a CSI-RS) associated with the TCI states indicated by the lowest codepoint of the message 600 (e.g., the TCI states 4 and 5) and the corresponding PDSCH share similar channel properties with respect to one or more QCL-types (e.g., a spatial Rx parameter for beamforming when the QCL-Type D is applicable). This default assumption may be applied when the time offset 758 between the reception of the DCI 754 and the corresponding PDSCH 756 is less than the QCL time duration threshold 760 (e.g., the timeDurationForQCL parameter) and at least one TCI codepoint 604 indicates two TCI states 602. Based on the assumption that DM-RS ports of the CSI-RS associated with the TCI states 4 and 5 are quasi co-located with the corresponding PDSCH, UE may proceed to receive the PDSCH. For instance, the UE may use the same beam to receive the PDSCH transmission 822 as the CSI-RS.

At 906, the UE identifies a second beam in response to a BFD of one or more first beams, as described in connection with 830 of FIG. 8. For example, 906 may be performed by an identification component 1044 of the apparatus 1002 of FIG. 10. The second beam may be identified based on a selected RS index for beam failure recovery, as described in connection with 832 of FIG. 8. The second beam may also be identified further based on at least one of a RACH transmission to the base station or a BFR message from the base station. For example, referring to FIG. 8, at 828, the UE 804 may detect beam failure of the one or more beams used for communicating data with the base station 802. At 830, after beam failure is detected (at 828), the UE 804 may perform CBD, as described above, to identify the selected RS index 832 from the candidate beam resources 816 received from the base station 802. The UE 804 may subsequently complete the BFR procedure by sending a beam failure recovery request (e.g., the beam failure recovery request 834 (RACH transmission) to the base station 802 based on a RACH preamble index associated with the selected RS index 832. The base station 802 may then send the beam failure recovery message 838 (e.g., a random access response) to the UE 804. When the UE 804 receives the RAR, the BFR procedure may be completed. The beam may thus be identified in response to BFD, CBD, and/or BFR.

When beam failure detection resources are not configured for the UE, and where the at least one TCI codepoint indicating the plurality of TCI states comprises a plurality of TCI codepoints and the one or more first default QCL assumptions are based on one or more TCI states corresponding to a lowest codepoint of the plurality of TCI codepoints, the second beam may be identified further in response to BFR or RLM based on a reference signal corresponding to at least one of the one or more first default QCL assumptions or the one or more TCI states. For example, referring to FIG. 8, if the UE 804 is not provided with the beam failure detection resources 814 (e.g., the base station 802 does not configure these resources for the UE 804 for performing RLM (at 826) or BFD (at 828)), the UE 804 may alternatively perform RLM or BFD using the reference signals corresponding to the one or more first default QCL assumptions 824 for PDSCH. That is, when the UE 804 receives the message 820 including a plurality of TCI codepoints indicating two TCI states (e.g., the message 600 in FIG. 6), the UE 804 may use the reference signals associated with the TCI states corresponding to the lowest codepoint of the plurality of TCI codepoints. For example, referring to FIG. 6, the TCI codepoint 0 may map to the TCI states 4 and 5 and the TCI codepoint 1 may map to the TCI states 10 and 13. Therefore, the UE 804 may perform BFD or RLM using the reference signals associated with the TCI states corresponding to the lowest codepoint (e.g., the codepoint 0 that maps to the TCI states 4 and 5) when beam failure detection resources 814 are not provided.

At 912, the UE receives, after identifying the second beam, a second transmission based on one or more second default QCL assumptions, where at least one of the one or more first default QCL assumptions or the one or more second default QCL assumptions are based on the message, as described in connection with the PDSCH transmission 842 of FIG. 8. For example, 912 may be performed by a second transmission component 1046 of the apparatus 1002 of FIG. 10. The one or more second default QCL assumptions may be effective when a time offset between DCI reception and PDSCH reception is less than a QCL time duration threshold. For example, referring to FIG. 8, after performing BFR, the UE 804 may receive a subsequent PDSCH transmission 842 based on one or more second default QCL assumptions 844 (e.g., when the time offset 758 between the reception of the DCI 754 and the corresponding PDSCH 756 is less than the QCL time duration threshold 760). Where the second default QCL assumptions 844 match (are the same as) the first default QCL assumptions 824 (e.g., the first option), the UE 804 may receive the PDSCH transmission 842 similarly to receipt of the PDSCH transmission 822 (e.g., based on the TCI states corresponding to a lowest codepoint of the TCI codepoints containing two different states in the message 820). Alternatively, where the second default QCL assumptions 844 are different than the first default QCL assumptions 824 (e.g., the second option), the UE 804 may apply the one or more second default QCL assumptions 844 according to any of the aforementioned examples. For example, the UE 804 may assume that the DM-RS ports of one or more reference signals (e.g., a CSI-RS) associated with the selected RS index 832 and the corresponding PDSCH share similar channel properties with respect to one or more QCL-types (e.g., a spatial Rx parameter for beamforming when the QCL-Type D relationship is applicable). Based on the assumption that DM-RS ports of the one or more reference signals are quasi co-located with the corresponding PDSCH, the UE 804 may proceed to receive the PDSCH. For instance, the UE 804 may use the same beam to receive the PDSCH transmission 842 as the CSI-RS.

In a first option, the at least one TCI codepoint indicating the plurality of TCI states may comprise a plurality of TCI codepoints, the one or more first default QCL assumptions may be based on one or more TCI states corresponding to a lowest codepoint of the plurality of TCI codepoints, and the one or more second default QCL assumptions may match the one or more first default QCL assumptions. For example, referring to FIG. 8, the one or more second default QCL assumptions 844 may be configured the same as the one or more first default QCL assumptions 824. That is, the base station 802 may configure the UE 804 (e.g., via the configuration 819) to continue using the one or more first default QCL assumptions 824 based on TCI states corresponding to the lowest codepoint among the TCI codepoints containing two different TCI states (e.g., the TCI codepoint 0 indicating the TCI states 4 and 5, and the TCI codepoint 1 indicating the TCI states 10 and 13, etc. of the message 600) as described above.

In such case of the first option, the second transmission may be associated with one or more TCI states of the plurality of TCI states. For example, referring to FIG. 8, in this option, the UE 804 may receive the PDSCH transmission 842 with two TCI states even after identifying a new beam. For example, referring to FIG. 7B, the UE may continue to receive PDSCH 756 (e.g., a first layer of a PDSCH transmission) from one TRP of a base station and PDSCH 756 (e.g., a second layer of the PDSCH transmission) from another TRP of the base station based on respective default QCL assumptions that the DM-RS ports of a reference signal associated with each of the two TCI states (e.g., the TCI state 4 for a first TRP and the TCI state 5 for a second TRP in FIG. 6) and the corresponding PDSCH share similar channel properties with respect to a corresponding QCL type.

In a second option, the one or more second default QCL assumptions may be different than the one or more first default QCL assumptions. In one example of the second option, the one or more second default QCL assumptions may be based on a TCI state of a CORESET associated with a monitored search space with a lowest CORESET-ID in a latest slot in which one or more CORESETs within an active BWP of a serving cell of the base station are monitored. For example, referring to FIG. 8, the one or more second default QCL assumptions 844 may be configured (at 810) to be based on the default QCL assumptions relating to the lowest CORESET-ID in the latest monitored slot, as described above with respect to FIG. 5B. For instance, if the UE receives the CORESET-0 562 (or another CORESET) in the latest monitored slot and that received CORESET is associated with the TCI state 15 in the example of FIG. 6, the UE may receive the PDSCH transmission 842 based on the default QCL assumption that the DM-RS ports of a reference signal associated with the TCI state 15 and corresponding PDSCH share similar channel properties with respect to an associated QCL type.

In another example of the second option, the one or more second default QCL assumptions may be based on a selected reference signal (RS) index for beam failure recovery. For example, referring to FIG. 8, the one or more second default QCL assumptions 844 may be configured (at 810) to be based on a QCL assumption of a selected RS index 832 for BFR. More particularly, referring to the single-DCI based multiple-TRP communication example of FIG. 7B, the base station 802 may configure the UE 804 (e.g., via the configuration 819) to, by default, assume that the DM-RS ports of the PDSCH include the same antenna port QCL parameters as the ones associated with the selected RS index from the set of candidate beam resources (qnew). For instance, if the selected RS index 832 for BFR is associated with QCL-Type D, the UE may receive the PDSCH transmission 842 based on the default QCL assumption that the DM-RS ports of the RS corresponding to the selected RS index 832 and the corresponding PDSCH share similar channel properties with respect to a spatial Rx parameter for beamforming.

In a further example of the second option, the one or more second default QCL assumptions may be based on an initial control resource set (CORESET-0). For example, referring to FIG. 8, the one or more second default QCL assumptions 844 may be configured (at 810) to be based on a QCL assumption of CORESET-0. For example, referring to the single-DCI based multiple-TRP communication example of FIG. 7B, the base station 802 may configure the UE 804 (e.g., via the configuration 819) to, by default, assume that the DM-RS ports of the PDSCH are quasi co-located with the RS(s) with respect to the QCL parameter(s) used for PDCCH quasi co-location indication of a CORESET-0. Thus, for the one or more second default QCL assumptions 844, the base station 802 may configure the UE 804 to assume that the TCI state associated with CORESET-0 (notwithstanding whether CORESET-0 is the CORESET with the lowest CORESET-ID in the latest monitored slot) indicates the TCI state for the PDSCH. For instance, if the CORESET-0 562 is associated with the TCI state 15 in the example of FIG. 6 described above, the UE 804 may receive the PDSCH transmission 842 based on the default QCL assumption that the DM-RS ports of a reference signal associated with the TCI state 15 and the corresponding PDSCH share similar channel properties with respect to an associated QCL type.

In an additional example of the second option, the at least one TCI codepoint indicating the plurality of TCI states may comprise a plurality of TCI codepoints each indicating a first TCI state and a second TCI state, and the one or more second default QCL assumptions may be based on the first TCI state corresponding to a lowest codepoint of the plurality of TCI codepoints. For example, referring to FIG. 8, the one or more second default QCL assumptions 844 may be configured (at 810) to be based on a first TCI state corresponding to the lowest codepoint among the TCI codepoints containing two different TCI states. For example, referring to the single-DCI based multiple-TRP communication example of FIG. 7B, the base station 802 may configure the UE 804 (e.g., via the configuration 819) to, by default, assume that the first TCI state associated with the lowest codepoint of the codepoints indicating two TCI states (e.g., the TCI state 4 corresponding to the codepoint 0 in the example of FIG. 6) indicate the TCI states for the PDSCH 756. For instance, the UE 804 may receive the PDSCH transmission 842 based on the QCL assumption that the DM-RS ports of a reference signal associated with the TCI state 4 and the corresponding PDSCH share similar channel properties with respect to an associated QCL type.

In such cases of the second option, the second transmission may be associated with a single TCI state of the plurality of TCI states. The second transmission may be associated with the single TCI state until a PDSCH MAC-CE for TCI state activation indicating at least one TCI codepoint indicating a plurality of TCI states is received. For example, referring to FIG. 8, in the aforementioned examples of the second option, the UE 804 may no longer receive the PDSCH transmission 842 with two TCI states immediately after identifying a new beam. Rather, the UE 804 may receive the PDSCH transmission with a single TCI state. For example, referring to FIG. 7B, the UE may receive the PDSCH 756 (e.g., a first layer of the PDSCH transmission) from one TRP of a base station and the PDSCH 756 (e.g., a second layer of the PDSCH transmission) from another TRP of the base station according to at least one of the aforementioned examples based on the second default QCL assumption 844 that the DM-RS ports of a reference signal associated with a single TCI state (e.g., the TCI state 4 for both TRPs in FIG. 6) and the corresponding PDSCH share similar channel properties with respect to a corresponding QCL type. However, once the UE 804 again receives a MAC-CE for PDSCH TCI state activation (e.g., the message 600) indicating at least one TCI codepoint indicating two TCI states, the UE 804 may again receive transmissions on PDSCH 756 based on the first default QCL assumption that the DM-RS ports of respective reference signals associated with the lowest codepoint of the two TCI states (e.g., the TCI state 4 for a first TRP and the TCI state 5 for a second TRP in FIG. 6) and the corresponding PDSCH share similar channel properties with respect to a corresponding QCL type.

At 908, the UE may reset the at least one TCI codepoint to indicate a different TCI state or QCL assumption after identifying the second beam, as described in connection with 840 of FIG. 8. For example, 908 may be performed by a reset component 1048 of the apparatus 1002 of FIG. 10. For instance, referring to FIG. 8, at 840, after BFD/BFR, the UE 804 and the base station 802 may optionally reset the TCI codepoints activated in the message 820 before receiving PDSCH transmissions based on the one or more second default QCL assumptions 844. The TCI codepoints may be reset to indicate a different state or QCL assumption after the new beam is identified (e.g., at 830 by the UE 804 and at 836 by the base station 802).

In one example of 908, the at least one TCI codepoint may be reset to indicate a QCL assumption of a selected RS index for beam failure recovery. For example, referring to FIG. 8, the TCI codepoints may each be reset to indicate a QCL assumption of the selected RS index 832 for BFR. For example, referring to FIG. 6, the TCI field 606 may include the codepoint 1, which is associated with the TCI states 10 and 13 (each corresponding to a different CSI-RS index in this example). Nevertheless, the UE 804 and the base station 802 may reset the codepoints 604 to each be associated with the CSI-RS index corresponding to the selected RS index 832 (qnew). Thus, irrespective of the values of the TCI field 606 (e.g., the codepoints 0 to 7) when the time offset 758 between the reception of the DCI 754 and the corresponding PDSCH 756 is greater than or equal to the QCL time duration threshold 760, the UE 804 and the base station 802 will assume that the DM-RS ports of the CSI-RS associated with the selected RS index 832 is quasi co-located with the corresponding PDSCH.

In another example of 908, the at least one TCI codepoint may be reset to indicate a QCL assumption of an initial control resource set (CORESET-0). For example, referring to FIG. 8, the TCI codepoints may each be reset to indicate a QCL assumption of CORESET-0. For example, referring to FIG. 6, the TCI field 606 may include the codepoint 1, which is associated with the TCI states 10 and 13 (each corresponding to a different CSI-RS index in this example). Nevertheless, the UE 804 and the base station 802 may reset the codepoints 604 to each be associated with the TCI state corresponding to the CORESET-0 562. For example, CORESET-0 may be configured to be associated with the TCI state 15 in one example. Thus, irrespective of the values of the TCI field 606 (e.g., the codepoints 0 to 7) when the time offset 758 between the reception of the DCI 754 and the corresponding PDSCH 756 is greater than or equal to the QCL time duration threshold 760, the UE 804 and the base station 802 will assume that the DM-RS ports of the reference signal associated with the TCI state 15 is quasi co-located with the corresponding PDSCH.

In a further example of 908, the at least one TCI codepoint indicating the plurality of TCI states may be reset to indicate a single TCI state. For example, referring to FIG. 8, each TCI codepoint indicating a plurality of TCI states may be reset to indicate a single TCI state. For example, referring to the codepoints 604 of FIG. 6, the TCI codepoint 0 may map to, or indicate, the TCI states 4 and 5, the TCI codepoint 1 may map to, or indicate, the TCI states 10 and 13, the TCI codepoint 2 may map to, or indicate, the TCI state 15, and so forth, up to the maximum number of active TCI states 808 for the UE 804. Nevertheless, the UE 804 and the base station 802 may reset the codepoints 604 such that the codepoints indicating two TCI states (e.g., the codepoints 0 and 1, but not the codepoint 2, for example) indicate the first of the two TCI states for each codepoint. For example, the codepoint 0 may be reset to indicate the TCI state 4, and the codepoint 1 may be reset to indicate the TCI state 10. Thus, when the time offset 758 between the reception of the DCI 754 and the corresponding PDSCH 756 is greater than or equal to the QCL time duration threshold 760, the UE 804 and the base station 802 may assume that the DM-RS ports of the reference signal associated with a single TCI state indicated in the TCI field 606 is quasi co-located with the PDSCH.

The one or more second default QCL assumptions or the resetting of the at least one TCI codepoint (at 908) may be effective when a time after one of the BFD, the RACH transmission, or the BFR response reception exceeds a time threshold. For example, referring to FIG. 8, the one or more second default QCL assumptions 844 for receiving the PDSCH transmission 842 and/or any TCI codepoints reset (at 840) may be configured to become effective immediately, or may be configured to become effective when a time after one of the BFD (at 828), the beam failure recover request 834 (the RACH transmission), or the reception of the BFR message 838 (RAR) exceeds the time threshold 846. For example, when the base station 802 sends the BFR message 838 to the UE 804 including PDCCH in a search space set provided by a higher layer parameter (recoverySearchSpaceID) as described above, the UE 804 and the base station 802 may apply the second default QCL assumptions 844 and/or reset the TCI codepoints N symbols after a last symbol of the first PDCCH where the UE 804 detects a DCI format with CRC scrambled by a C-RNTI or MCS-C-RNTI of the UE 804 is received. The value "N" may represent an integer, such as 28 symbols.

Finally, at 910, the UE may determine the one or more second default QCL assumptions to be one of the same or different than the one or more first default QCL assumptions based on UE capability or a RRC configuration from the base station, as described in connection with 818 of FIG. 8. For example, 910 may be performed by a determination component 1050 of the apparatus 1002 of FIG. 10. For instance, the one or more second default QCL assumptions may be determined to match the one or more first default QCL assumptions when a maximum number of active TCI states supported by the UE is greater than a threshold, and the one or more second default QCL assumptions may be determined to be different than the one or more first default QCL assumptions when the maximum number of active TCI states supported by the UE is less than the threshold. For example, referring to FIG. 8, the UE 804 may determine (at 818) the one or more second default QCL assumptions 844 according to one of the first option or the second option based on the information regarding UE capability 806 transmitted to the base station 802 and/or one or more RRC configurations 812 received from the base station 802, as described above. For example, the UE 804 may determine the one or more second default QCL assumptions 844 to match (or be the same as) the one or more first default QCL assumptions 824 (the first option) if the maximum number of active TCI states 808 is greater than a threshold number (e.g., 2 active TCI states, 3 active TCI states, etc.). Similarly, the UE 804 may determine the one or more second default QCL assumptions to be different than the one or more first default QCL assumptions (according to any example of the second option) if the maximum number of active TCI states is less than or equal to the threshold number.

Figure 10:
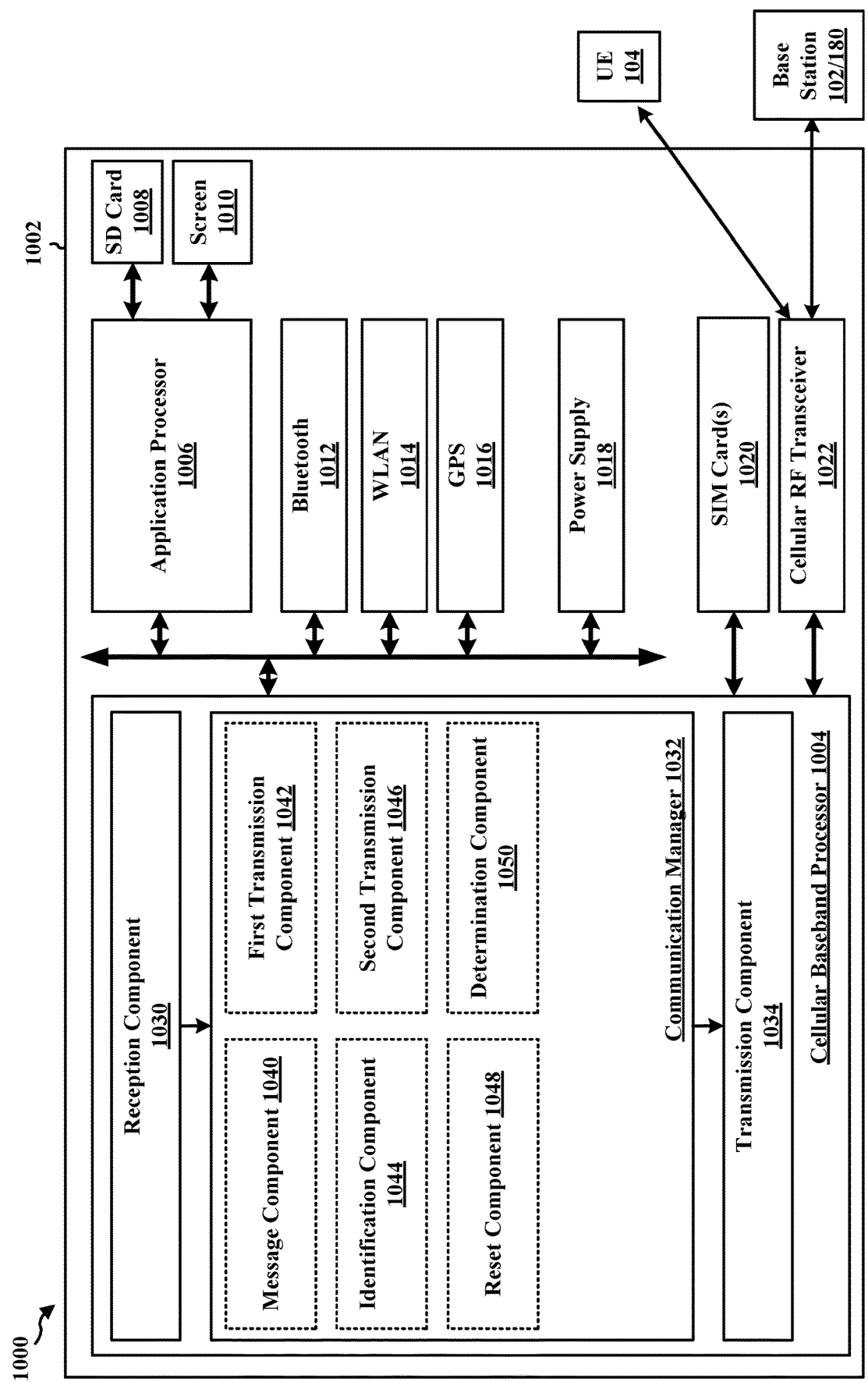
FIG. 10 is a diagram illustrating an example of a hardware implementation for an example apparatus, in accordance with the teachings disclosed herein.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or base station 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see the UE 350 of FIG. 3) and include the aforediscussed additional modules of the apparatus 1002.

The communication manager 1032 includes a message component 1040 that is configured to receive a message from a base station indicating at least one TCI codepoint indicating a plurality of TCI states, for example, as described in connection with 902 of FIG. 9. The communication manager 1032 also includes a first transmission component 1042 that is configured to receive a first transmission of a PDSCH based on one or more first default QCL assumptions, for example, as described in connection with 904 of FIG. 9. The communication manager 1032 also includes an identification component 1044 that is configured to identify a second beam in response to a beam failure detection of one or more first beams, for example, as described in connection with 906 of FIG. 9. The communication manager 1032 also includes a second transmission component 1046 that is configured to receive, after identifying the second beam, a second transmission based on one or more second default QCL assumptions, where at least one of the one or more first default QCL assumptions or the one or more second default QCL assumptions are based on the message, for example, as described in connection with 912 of FIG. 9. The communication manager 1032 also includes a reset component 1048 that is configured to reset the at least one TCI codepoint to indicate a different TCI or QCL assumption after identifying the second beam, for example, as described in connection with 908 of FIG. 9. The communication manager 1032 also includes a determination component 1050 that is configured to determine the one or more second default QCL assumptions to be one of the same or different than the one or more first default QCL assumptions based on UE capability or an RRC configuration from the base station, for example, as described in connection with 910 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving a message from a base station indicating at least one TCI codepoint indicating a plurality of TCI states. The example apparatus 1002 also includes means for receiving a first transmission of a PDSCH based on one or more first default QCL assumptions. The example apparatus 1002 also includes means for identifying a second beam in response to a BFD of one or more first beams. The example apparatus 1002 also includes means for receiving, after identifying the second beam, a second transmission based on one or more second default QCL assumptions, and where at least one of the one or more first default QCL assumptions or the one or more second default QCL assumptions are based on the message.

In another configuration, the example apparatus 1002 also includes means for resetting the at least one TCI codepoint to indicate a different TCI state or QCL assumption after identifying the second beam.

In another configuration, the example apparatus 1002 also includes means for determining the one or more second default QCL assumptions to be one of matching or different than the one or more first default QCL assumptions based on UE capability or an RRC configuration from the base station.

The aforementioned means may be one or more of the aforementioned components of the apparatus 1002 configured to perform the functions recited by the aforementioned means. As described supra, the apparatus 1002 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 11:
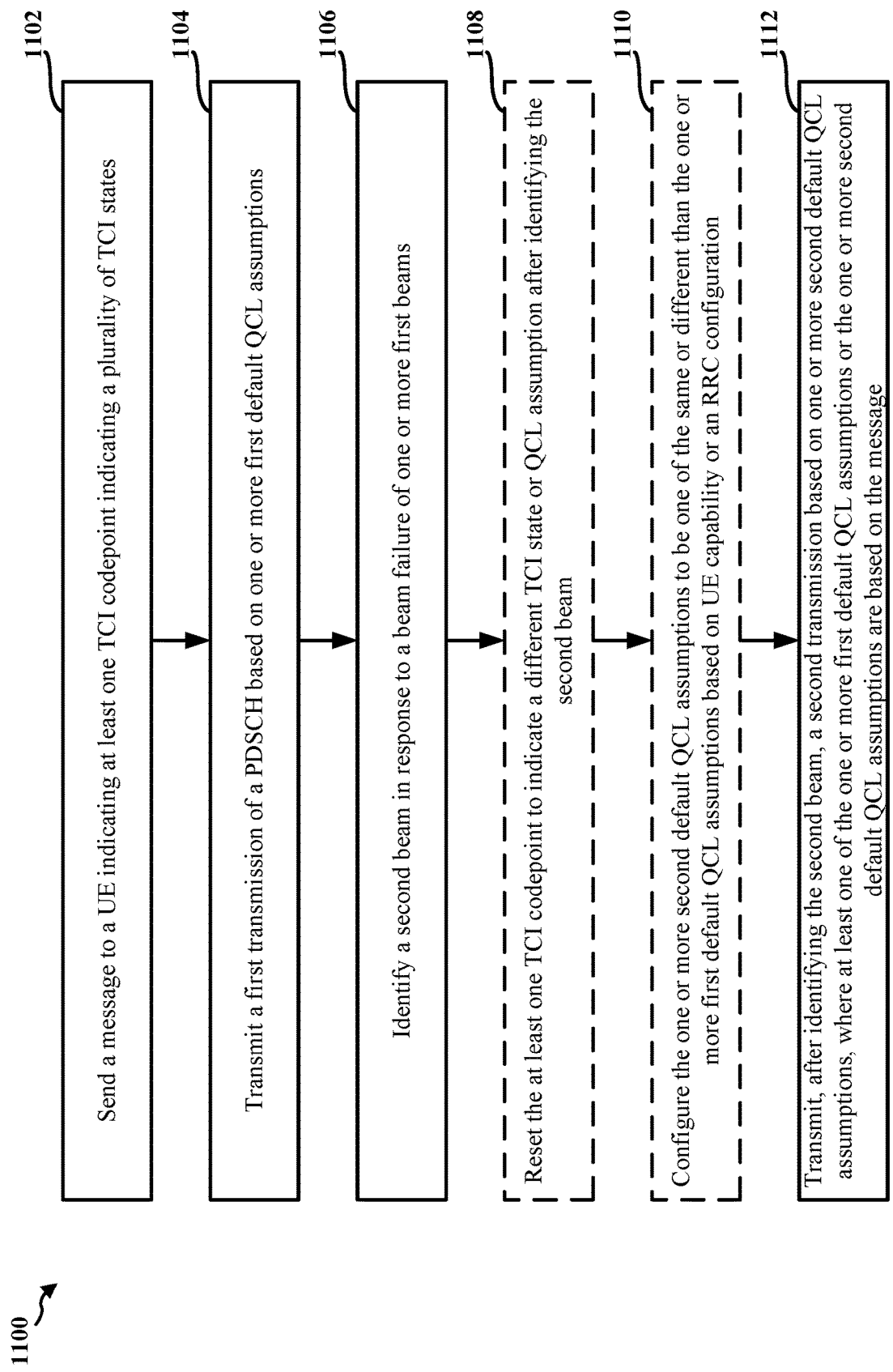
FIG. 11 is a flowchart of a method of wireless communication at a base station, in accordance with the teachings disclosed herein.

FIG. 11 is a flowchart 1100 of a method of wireless communication. The method may be performed by a base station (e.g., the base station 102/180, the base station 310, the base station 802, and/or an apparatus 1202 of FIG. 12). Optional aspects are illustrated with a dashed line. The method provides default QCL assumptions for base stations to apply after identifying a new beam from BFD/CBD/BFR for single-DCI multi-TRP communication.

At 1102, the base station sends a message to a UE indicating at least one TCI codepoint indicating a plurality of TCI states, as described in connection with the message 820 of FIG. 8. For example, 1102 may be performed by a message component 1240 of the apparatus 1202 of FIG. 12. The message may comprise a PDSCH MAC-CE for TCI state activation. For example, referring to FIG. 8, the UE 804 may receive the message 820 from the base station 802 including the MAC-CE 821. Referring to FIG. 6, the MAC-CE may be a TCI States Activation/Deactivation for UE-specific PDSCH MAC-CE (e.g., the MAC-CE 601 of FIG. 6) that indicates a set of activated TCI states 602 mapped to the codepoints 604 of the TCI field 606 of the DCI 608. At least one codepoint may be mapped to a plurality of TCI states. For example, as illustrated in FIG. 6, the TCI codepoint 0 may map to, or indicate, the TCI states 4 and 5 (e.g., the T4 for a first TRP and the T5 for a second TRP), the TCI codepoint 1 may map to, or indicate, the TCI states 10 and 13 (e.g., the T10 for a first TRP and the T13 for a second TRP), the TCI codepoint 2 may map to, or indicate, the single TCI state 15 (e.g., for one of the two TRPs), and so forth, up to the maximum number of active TCI states 808 for the UE 804.

At 1104, the base station transmits a first transmission of a PDSCH based on one or more first default QCL assumptions, as described in connection with the PDSCH transmission 822 of FIG. 8. For example, 1104 may be performed by a first transmission component 1242 of the apparatus 1202 of FIG. 12. The one or more first default QCL assumptions may be effective when a time offset between DCI reception and PDSCH reception is less than a QCL time duration threshold. For example, referring to FIG. 8, the base station 802 may transmit the PDSCH transmission 822 to the UE 804 based on one or more first default QCL assumptions 824. For instance, as described above with respect to FIGS. 6 and 7B, the base station 802 may, by default, assume that the TCI states corresponding to a lowest codepoint of the TCI codepoints containing two different states (e.g., the TCI states 4 and 5 corresponding to the TCI codepoint 0 in the above example) indicate the TCI states for the PDSCH. Thus, as described above, the base station 802 may assume that the DM-RS ports of one or more reference signals (e.g., a CSI-RS) associated with the TCI states indicated by the lowest codepoint of message 600 (e.g., the TCI states 4 and 5) and the PDSCH share similar channel properties with respect to one or more QCL-types (e.g., a spatial Rx parameter for beamforming when the QCL-Type D relationship is applicable). This default assumption may be applied when the time offset 758 between the reception of the DCI 754 and the corresponding PDSCH 756 is less than the QCL time duration threshold 760 (the timeDurationForQCL-threshold) and at least one TCI codepoint 604 indicates two TCI states 602. Based on the assumption that DM-RS ports of the CSI-RS associated with the TCI states 4 and 5 are quasi co-located with the PDSCH, the base station 802 may proceed to transmit the PDSCH. For instance, the base station 802 may use the same beam to send the PDSCH transmission 822 as the CSI-RS.

At 1106, the base station identifies a second beam in response to a beam failure of one or more first beams, as described in connection with 836 of FIG. 8. For example, 1106 may be performed by an identification component 1244 of the apparatus 1202 of FIG. 12. The second beam may be identified based on a selected RS index for beam failure recovery. The second beam may also be identified further based on at least one of a random access message from the UE 804 (e.g. a RACH transmission) or a BFR message to the UE 804. For example, referring to FIG. 8, after the UE 804 detects beam failure (at 828) of the one or more beams used for communicating data with the base station 802, and after the UE 804 performs CBD (at 830), as described above, to identify a selected RS index 832 from the candidate beam resources 816 received from the base station 802, the UE 804 may subsequently complete the BFR procedure by sending a beam failure recovery request (e.g., the beam failure recovery request 834 (the RACH transmission)) to the base station 802 based on a RACH preamble index associated with the selected RS index 832. The base station 802 may then identify the beam based on the RACH preamble index associated with the selected RS index 832, and send the beam failure recovery message 838 (e.g., a random access response) to the UE 804. When the UE 804 receives the beam failure recovery message 838, the BFR procedure may be complete. The beam may, thus, be identified in response to BFD, CBD, and/or BFR.

When beam failure detection resources are not configured for the UE, and where the at least one TCI codepoint indicating the plurality of TCI states comprises a plurality of TCI codepoints and the one or more first default QCL assumptions are based on one or more TCI states corresponding to a lowest codepoint of the plurality of TCI codepoints, the second beam may be identified further in response to BFR or RLM based on a reference signal corresponding to at least one of the one or more first default QCL assumptions or the one or more TCI states. For example, referring to FIG. 8, if the UE 804 is not provided with the beam failure detection resources 814 (e.g., the base station 802 abstains from configuring the beam failure detection resources 814 for the UE 804 for performing RLM (at 826) or BFD (at 828)), the UE 804 may alternatively perform RLM or BFD using the reference signals corresponding to the one or more first default QCL assumptions 824 for PDSCH. That is, when the UE 804 receives the message 820 including a plurality of TCI codepoints indicating two TCI states (e.g., the message 600 in FIG. 6), the UE 804 may use the reference signals associated with the TCI states corresponding to the lowest codepoint of the plurality of TCI codepoints. For example, referring to FIG. 6, the TCI codepoint 0 may map to the TCI states 4 and 5 and the TCI codepoint 1 may map to the TCI states 10 and 13. Therefore, the UE 804 may perform BFD or RLM using the reference signals associated with the TCI states corresponding to the lowest codepoint (e.g., the codepoint 0 that maps to the TCI states 4 and 5), when the beam failure detection resources 814 are not provided. When the UE 804 sends the beam failure recovery request 834 to the base station 802 based on the RACH preamble index associated with the aforementioned reference signal(s), the base station 802 may identify the beam as described immediately above.

At 1112, the base station transmits, after identifying the second beam, a second transmission based on one or more second default QCL assumptions, where at least one of the one or more first default QCL assumptions or the one or more second default QCL assumptions are based on the message, as described in connection with the PDSCH transmission 842 of FIG. 8. For example, 1112 may be performed by a second transmission component 1246 of the apparatus 1202 of FIG. 12. The one or more second default QCL assumptions may be effective when a time offset between DCI reception and PDSCH reception is less than a QCL time duration threshold. For example, referring to FIG. 8, after performing BFR, the base station 802 may transmit to the UE 804 a subsequent PDSCH transmission 842 based on one or more second default QCL assumptions 844 (e.g., when the time offset 758 between the reception of the DCI 754 and the corresponding PDSCH 756 is less than the QCL time duration threshold 760). Where the second default QCL assumptions 844 are the same as the first default QCL assumptions 824 (e.g., the first option), the base station 802 may transmit the PDSCH transmission 842 similarly to the transmission of the PDSCH transmission 822 (e.g., based on the TCI states corresponding to a lowest codepoint of the TCI codepoints containing two different states in the message 820). Alternatively, where the second default QCL assumptions 844 are different than the first default QCL assumptions 824 (e.g., the second option), the base station 802 may apply the one or more second default QCL assumptions 844 according to any of the aforementioned examples. For example, the base station 802 may assume that the DM-RS ports of one or more reference signals (e.g., a CSI-RS) associated with the selected RS index 832 and the PDSCH share similar channel properties with respect to one or more QCL-types (e.g., a spatial Rx parameter for beamforming when the QCL-Type D relationship is applicable). Based on the assumption that the DM-RS ports of one or more reference signals are quasi co-located with the PDSCH, the base station 802 may proceed to send the PDSCH. For instance, the base station 802 may use the same beam to send the PDSCH transmission 842 as the CSI-RS.

In a first option, the at least one TCI codepoint indicating the plurality of TCI states may comprise a plurality of TCI codepoints, the one or more first default QCL assumptions may be based on one or more TCI states corresponding to a lowest codepoint of the plurality of TCI codepoints, and the one or more second default QCL assumptions may match (or be the same as) the one or more first default QCL assumptions. For example, referring to FIG. 8, the one or more second default QCL assumptions 844 may be configured the same as the one or more first default QCL assumptions 824. That is, the base station 802 may configure the UE 804 (e.g., via the configuration 819) to continue using the one or more first default QCL assumptions 824 based on TCI states corresponding to the lowest codepoint among the TCI codepoints containing two different TCI states (e.g., the TCI codepoint 0 indicating the TCI states 4 and 5 and the TCI codepoint 1 indicating the TCI states 10 and 13, etc. of the message 820) as described above.

In such case of the first option, the second transmission may be associated with one or more TCI states of the plurality of TCI states. For example, referring to FIG. 8, in this option, the base station 802 may transmit the PDSCH transmission 842 with two TCI states even after identifying a new beam. For example, referring to FIG. 7B, the base station may continue to send the PDSCH 756 (e.g., a first layer of a PDSCH transmission) from one TRP and the PDSCH 756 (e.g., a second layer of the PDSCH transmission) from another TRP based on respective default QCL assumptions that the DM-RS ports of a reference signal associated with each of the two TCI states (e.g., the TCI state 4 for a first TRP and the TCI state 5 for a second TRP in FIG. 6) and the PDSCH share similar channel properties with respect to a corresponding QCL type.

In a second option, the one or more second default QCL assumptions may be different than the one or more first default QCL assumptions. In one example of the second option, the one or more second default QCL assumptions may be based on a TCI state of a CORESET associated with a monitored search space with a lowest CORESET-ID in a latest slot in which one or more CORESETs within an active BWP of a serving cell of the base station are monitored. For example, referring to FIG. 8, the one or more second default QCL assumptions 844 may be configured (at 810) to be based on the default QCL assumptions relating to the lowest CORESET-ID in the latest monitored slot as described above with respect to FIG. 5B. For instance, if the base station 802 transmits the CORESET-0 562 (or another CORESET) in the latest monitored slot and transmitted CORESET is associated with the TCI state 15 in the example of FIG. 6 described above, the base station 802 may transmit the PDSCH transmission 842 based on the default QCL assumption that the DM-RS ports of a reference signal associated with the TCI state 15 and the corresponding PDSCH share similar channel properties with respect to an associated QCL type.

In another example of the second option, the one or more second default QCL assumptions may be based on a selected RS index for beam failure recovery. For example, referring to FIG. 8, the one or more second default QCL assumptions may be configured (at 810) to be based on a QCL assumption of a selected RS index for BFR. More particularly, referring to the single-DCI based multiple-TRP communication example of FIG. 7B, the base station 802 may configure the UE 804 (e.g., via the configuration 819) to, by default, assume that the DM-RS ports of the PDSCH include the same antenna port QCL parameters as the ones associated with the selected RS index from the set of candidate beam resources (qnew). For instance, if the selected RS index for BFR is associated with QCL-Type D, the base station 802 may send the PDSCH transmission 842 based on the default QCL assumption that the DM-RS ports of the RS corresponding to the selected RS index and the corresponding PDSCH share similar channel properties with respect to a spatial Rx parameter for beamforming.

In a further example of the second option, the one or more second default QCL assumptions may be based on an initial control resource set (CORESET-0). For example, referring to FIG. 8, the one or more second default QCL assumptions 844 may be configured (at 810) to be based on a QCL assumption of CORESET-0. More particularly, referring to the single-DCI based multiple-TRP communication example of FIG. 7B, the base station 802 may configure the UE 804 (e.g., via the configuration 819) to, by default, assume that the DM-RS ports of the PDSCH are quasi co-located with the RS(s) with respect to the QCL parameter(s) used for PDCCH quasi co-location indication of a CORESET-0. Thus, for the one or more second default QCL assumptions, the base station may configure the UE to assume that the TCI state associated with CORESET-0 (notwithstanding whether CORESET-0 is the CORESET with the lowest CORESET-ID in the latest monitored slot) indicates the TCI state for the PDSCH. For instance, if the CORESET-0 562 is associated with the TCI state 15 in the example of FIG. 6 described above, the base station 802 may send the PDSCH transmission 842 based on the default QCL assumption that the DM-RS ports of a reference signal associated with the TCI state 15 and the PDSCH share similar channel properties with respect to an associated QCL type.

In an additional example of the second option, the at least one TCI codepoint indicating the plurality of TCI states may comprise a plurality of TCI codepoints each indicating a first TCI state and a second TCI state, and the one or more second default QCL assumptions may be based on the first TCI state corresponding to a lowest codepoint of the plurality of TCI codepoints. For example, referring to FIG. 8, the one or more default QCL assumptions may be configured (at 810) to be based on a first TCI state corresponding to the lowest codepoint among the TCI codepoints containing two different TCI states. More particularly, referring to the single-DCI based multiple-TRP communication example of FIG. 7B, the base station 802 may configure the UE 804 (e.g., via the configuration 819) to, by default, assume that the first TCI state associated with the lowest codepoint of the codepoints indicating two TCI states (e.g., the TCI state 4 corresponding to the codepoint 0 in the example of FIG. 6) indicate the TCI states for the PDSCH 756. For instance, the base station 802 may send the PDSCH transmission 842 based on the QCL assumption that the DM-RS ports of a reference signal associated with the TCI state 4 and the corresponding PDSCH share similar channel properties with respect to an associated QCL type.

In such cases of the second option, the second transmission may be associated with a single TCI state of the plurality of TCI states. The second transmission may be associated with the single TCI state until a PDSCH MAC-CE for TCI state activation indicating at least one TCI codepoint indicating a plurality of TCI states is received. For example, referring to FIG. 8, in the aforementioned examples of the second option, the base station 802 may no longer send the PDSCH transmission 842 with two TCI states immediately after identifying a new beam. Rather, the base station 802 may send the PDSCH transmission with a single TCI state. For example, referring to FIG. 7B, the base station may send PDSCH 756 (e.g., a first layer of the PDSCH transmission) from one TRP and PDSCH 756 (e.g., a second layer of the PDSCH transmission) from another TRP according to at least one of the aforementioned examples based on the second default QCL assumption that the DM-RS ports of a reference signal associated with a single TCI state (e.g., the TCI state 4 for both TRPs in FIG. 6) and the PDSCH share similar channel properties with respect to a corresponding QCL type. However, once the base station again sends a MAC-CE for PDSCH TCI state activation (e.g., the message 600) indicating at least one TCI codepoint indicating two TCI states, the base station may again send transmissions on PDSCH 756 based on the first default QCL assumption that the DM-RS ports of respective reference signals associated with the lowest codepoint of the two TCI states (e.g., the TCI state 4 for a first TRP and the TCI state 5 for a second TRP in FIG. 6) and the corresponding PDSCH share similar channel properties with respect to a corresponding QCL type.

At 1108, the base station may reset the at least one TCI codepoint to indicate a different TCI state or QCL assumption after identifying the second beam, as described in connection with 840 of FIG. 8. For example, 1108 may be performed by a reset component 1248 of the apparatus 1202 of FIG. 12. For instance, referring to FIG. 8, at 840, after BFD/BFR, the UE 804 and the base station 802 may optionally reset the TCI codepoints activated in the message 820 before receiving PDSCH transmissions based on the one or more second default QCL assumptions 844. The TCI codepoints may be reset to indicate a different state or QCL assumption after the new beam is identified (e.g., by the UE 804 at 830 and by the base station 802 at 836).

In one example of 1108, the at least one TCI codepoint may be reset to indicate a QCL assumption of a selected RS index for beam failure recovery. For example, referring to FIG. 8, the TCI codepoints may each be reset to indicate a QCL assumption of the selected RS index 832 for BFR. For example, referring to FIG. 6, the TCI field 606 may include the codepoint 1, which is associated with the TCI states 10 and 13 (each corresponding to a different CSI-RS index in this example). Nevertheless, the UE 804 and the base station 802 may reset the codepoints 604 to each be associated with the CSI-RS index corresponding to the selected RS index 832 (qnew). Thus, irrespective of the values of the TCI field 606 (e.g., the codepoints 0 to 7) when the time offset 758 between the reception of the DCI 754 and the corresponding PDSCH 756 is greater than or equal to the QCL time duration threshold 760, the UE 804 and the base station 802 may assume that the DM-RS ports of the CSI-RS associated with the selected RS index 832 is quasi co-located with the corresponding PDSCH.

In another example of 1108, the at least one TCI codepoint may be reset to indicate a QCL assumption of an initial control resource set (CORESET-0). For example, referring to FIG. 8, the TCI codepoints may each be reset to indicate a QCL assumption of CORESET-0. For example, referring to FIG. 6, the TCI field 606 may currently include the TCI codepoint 1, which is associated with the TCI states 10 and 13 (each corresponding to a different CSI-RS index in this example). Nevertheless, the UE 804 and the base station 802 may reset the codepoints 604 to each be associated with the TCI state corresponding to the CORESET-0 562. For example, CORESET-0 may be configured to be associated with the TCI state 15 in one example. Thus, irrespective of the values of the TCI field 606 (e.g., the codepoints 0 to 7) when the time offset 758 between the reception of the DCI 754 and the corresponding PDSCH 756 is greater than or equal to the QCL time duration threshold 760, the UE 804 and the base station 802 may assume that the DM-RS ports of the reference signal associated with the TCI state 15 is quasi co-located with the PDSCH.

In a further example of 1108, the at least one TCI codepoint indicating the plurality of TCI states may be reset to indicate a single TCI state. For example, referring to FIG. 8, each TCI codepoint indicating a plurality of TCI states may be reset to indicate a single TCI state. For example, referring to the codepoints 604 of FIG. 6, the TCI codepoint 0 maps to, or indicates, the TCI states 4 and 5, the TCI codepoint 1 maps to, or indicates, the TCI states 10 and 13, the TCI codepoint 2 maps to, or indicates, the TCI state 15, and so forth, up to the maximum number of active TCI states 808 for the UE 804. Nevertheless, the UE 804 and the base station 802 may reset the codepoints 604 such that the codepoints indicating two TCI states (e.g., the TCI codepoints 0 and 1, but not the TCI codepoint 2, for example) currently indicate the first of the two TCI states for each codepoint. For example, the TCI codepoint 0 may be reset to indicate the TCI state 4, and the codepoint 1 may be reset to indicate the TCI state 10. Thus, when the time offset 758 between the reception of the DCI 754 and the corresponding PDSCH 756 is greater than or equal to the QCL time duration threshold 760, the UE 804 and the base station 802 may assume that the DM-RS ports of the reference signal associated with a single TCI state indicated in the TCI field 606 is quasi co-located with the PDSCH.

The one or more second default QCL assumptions or the resetting of the at least one TCI codepoint at 1108 may be effective when a time after one of the BFD, the random access message (e.g., a RACH transmission), or the BFR response reception exceeds a time threshold. For example, referring to FIG. 8, the one or more second default QCL assumptions 844 for receiving the PDSCH transmission 842 and/or any TCI codepoints reset (at 840) may be configured to become effective immediately, or may be configured to become effective when a time after one of the BFD (at 828), the beam failure recovery request 834 (the RACH transmission), or the reception of the BFR message 838 exceeds a time threshold 846. For example, when the base station 802 sends the BFR message 838 to the UE 804 including PDCCH in a search space set provided by a higher layer parameter for a recovery search space (recoverySearchSpaceID), as described above, the UE 804 and the base station 802 may apply the second default QCL assumptions and/or reset the TCI codepoints N symbols after a last symbol of the first PDCCH where the UE 804 detects a DCI format with CRC scrambled by a C-RNTI or MCS-C-RNTI of the UE 804 is received. The value "N" may represent an integer, such as 28 symbols.

Finally, at 1110, the base station may configure the one or more second default QCL assumptions to be one of the same or different than the one or more first default QCL assumptions based on UE capability or a RRC configuration, as described in connection with 810 of FIG. 8. For example, 1110 may be performed by a configuration component 1250 of the apparatus 1202 of FIG. 12. For instance, the one or more second default QCL assumptions may be configured to match (or be the same as) the one or more first default QCL assumptions when a maximum number of active TCI states supported by the UE is greater than a threshold, and the one or more second default QCL assumptions may be configured to be different than the one or more first default QCL assumptions when the maximum number of active TCI states supported by the UE is less than the threshold. For example, referring to FIG. 8, the base station 802 may configure the one or more second default QCL assumptions 844 according to one of the first option or the second option described above based on the information regarding UE capability 806 received from the UE 804. For example, the base station 802 may configure the one or more second default QCL assumptions 844 to match (or be the same as) the one or more first default QCL assumptions 824 (the first option) if the maximum number of active TCI states 808 is greater than a threshold number (e.g., 2 active TCI states, 3 active TCI states, etc.). Similarly, the base station 802 may configure the one or more second default QCL assumptions 844 to be different than the one or more first default QCL assumptions 824 (according to any example of the second option) if the maximum number of active TCI states is less than or equal to the threshold number.

Still referring to FIG. 8, the base station 802 may also configure the one or more second default QCL assumptions 844 according to one of the first option or the second option described above based on one or more RRC configurations 812 sent to the UE 804. For example, the configuration 819 may be based on one or more parameters in the one or more RRC configurations 812, such as the beam failure detection resources 814 or the candidate beam resources 816 that are configured for and transmitted to the UE 804 for BFD and CBD as described above, and/or based on other RRC parameters. For example, the base station 802 may configure a parameter in the RRC configurations 812 that uses one bit to indicate whether the UE 804 is to apply option 1 (e.g., a "0" value) or option 2 (e.g., a "1" value). In another example, the base station 802 may configure a parameter in the RRC configurations 812 that uses two bits to indicate which of the four examples of option 2, described above, that the UE 804 is to apply.

Figure 12:
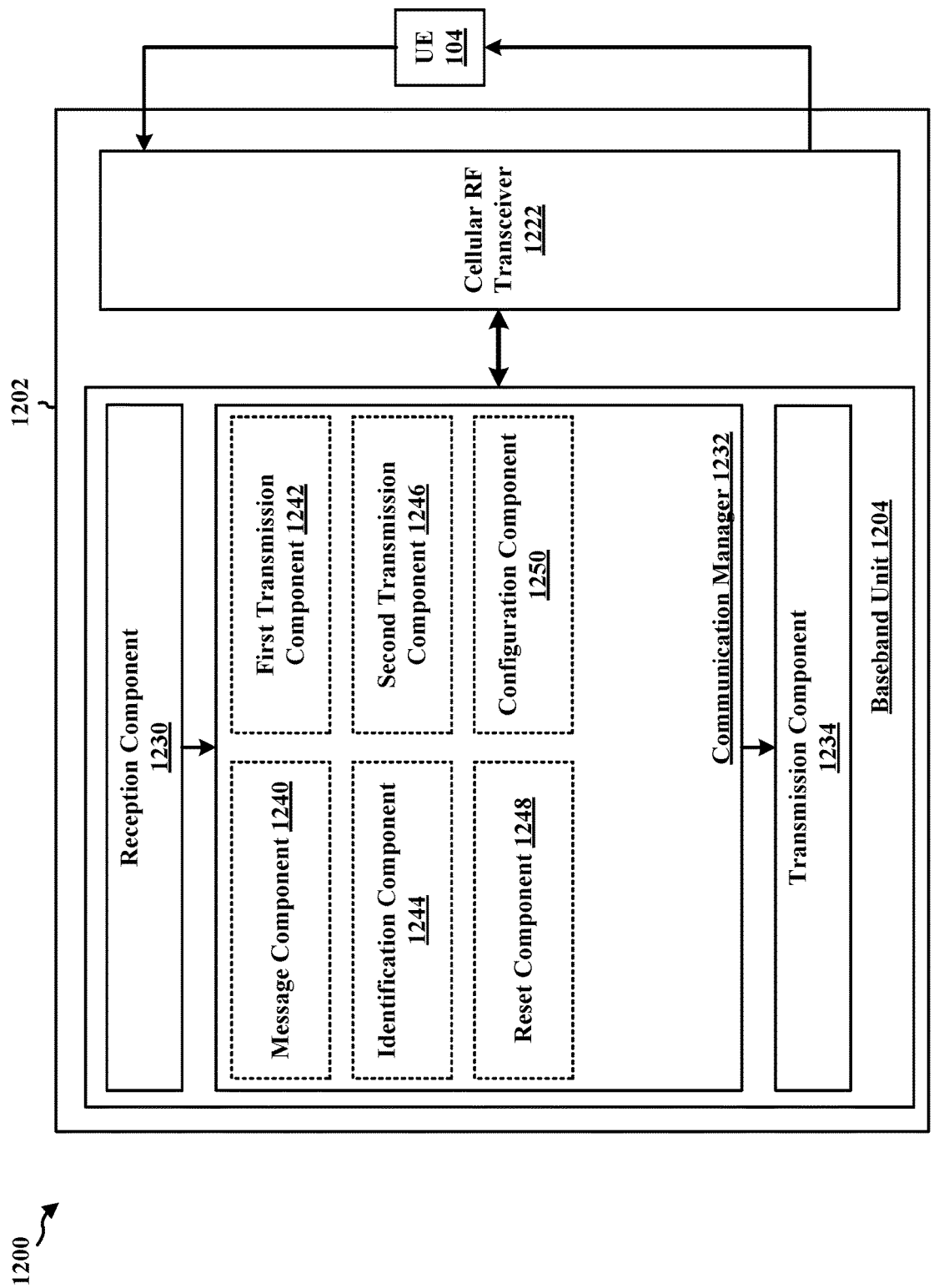
FIG. 12 is a diagram illustrating an example of a hardware implementation for an example apparatus, in accordance with the teachings disclosed herein.

FIG. 12 is a diagram 1200 illustrating an example of a hardware implementation for an apparatus 1202. The apparatus 1202 is a base station and includes a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a message component 1240 that is configured to send a message to a UE indicating at least one TCI codepoint indicating a plurality of TCI states, for example, as described in connection with 1102 of FIG. 11. The communication manager 1232 also includes a first transmission component 1242 that is configured to transmit a first transmission of a PDSCH based on one or more first default QCL assumptions, for example, as described in connection with 1104 of FIG. 11. The communication manager 1232 also includes an identification component 1244 that is configured to identify a second beam in response to a beam failure of one or more first beams, for example, as described in connection with 1106 of FIG. 11. The communication manager 1232 also includes a second transmission component 1246 that is configured to transmit, after identifying the second beam, a second transmission based on one or more second default QCL assumptions, where at least one of the one or more first default QCL assumptions or the one or more second default QCL assumptions are based on the message, for example, as described in connection with 1112 of FIG. 11. The communication manager 1232 also includes a reset component 1248 that is configured to reset the at least one TCI codepoint to indicate a different TCI state or QCL assumption after identifying the second beam, for example, as described in connection with 1108 of FIG. 11. The communication manager 1232 also includes a configuration component 1250 that is configured to configure the one or more second default QCL assumptions to be one of the same or different than the one or more first default QCL assumptions based on UE capability or an RRC configuration, for example, as described in connection with 1110 of FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for sending a message to a UE indicating at least one TCI codepoint indicating a plurality of TCI states. The example apparatus 1202 also includes means for transmitting a first transmission of a PDSCH based on one or more first default QCL assumptions. The example apparatus 1202 also includes means for identifying a second beam in response to a beam failure of one or more first beams. The example apparatus 1202 also includes means for transmitting, after identifying the second beam, a second transmission based on one or more second default QCL assumptions, and where at least one of the one or more first default QCL assumptions or the one or more second default QCL assumptions are based on the message.

In another configuration, the example apparatus 1202 also includes means for resetting the at least one TCI codepoint to indicate a different TCI state or QCL assumption after identifying the second beam.

In another configuration, the example apparatus 1202 also includes means for configuring the one or more second default QCL assumptions to be one of the same or different than the one or more first default QCL assumptions based on UE capability or an RRC configuration.

The aforementioned means may be one or more of the aforementioned components of the apparatus 1202 configured to perform the functions recited by the aforementioned means. As described supra, the apparatus 1202 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

Accordingly, the present disclosure provides default QCL assumptions for UEs and base stations to apply after identifying a new beam from BFD/CBD/BFR for single-DCI based multiple-TRP communication. The default QCL assumptions for PDSCH before identifying the new beam may be configured to remain unchanged after the identification, thus continuing to be based on the TCI states corresponding to a lowest codepoint among TCI codepoints containing two different TCI states. Alternatively, the default QCL assumptions for PDSCH may be reset or changed after the identification to be based on at least one of a lowest CORESET-ID in a latest monitored slot, a selected RS index during BFR, CORESET-0, or a first TCI state corresponding to a lowest TCI codepoint indicating two TCI states. Moreover, when the UE is not configured with a set of beam failure detection resources for BFD, the UE may use the RS corresponding to the default QCL assumptions for PDSCH (e.g., that is associated with the TCI states corresponding to a lowest codepoint among the TCI codepoints containing two different TCI states) as the beam failure detection resources. As a result, the present disclosure may alleviate confusion by allowing the UE and the base station to determine the default QCL assumptions to apply during and after BFR for single-DCI based multiple-TRP communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a user Equipment (UE), comprising: receiving a message from a base station indicating at least one transmission configuration indicator (TCI) codepoint indicating a plurality of TCI states; receiving a first transmission of a physical downlink shared channel (PDSCH) based on one or more first default quasi co-location (QCL) assumptions; identifying a second beam in response to a beam failure detection (BFD) of one or more first beams; and receiving, after identifying the second beam, a second transmission based on one or more second default QCL assumptions, where at least one of the one or more first default QCL assumptions or the one or more second default QCL assumptions are based on the message.

Aspect 2 is the method of aspect 1, further including that the one or more first default QCL assumptions and the one or more second default QCL assumptions are effective when a time offset between downlink control information (DCI) reception and PDSCH reception is less than a QCL time duration threshold.

Aspect 3 is the method of any of aspect 1 or aspect 2, further including that the message comprises a PDSCH medium access control (MAC) control element (MAC-CE) for TCI state activation.

Aspect 4 is the method of any of aspects 1 to 3, further including that the second beam is identified based on a selected reference signal (RS) index for beam failure recovery.

Aspect 5 is the method of any of aspects 1 to 4, further including that the at least one TCI codepoint indicating the plurality of TCI states comprises a plurality of TCI codepoints, that the one or more first default QCL assumptions are based on one or more TCI states corresponding to a lowest codepoint of the plurality of TCI codepoints, and that the one or more second default QCL assumptions match the one or more first default QCL assumptions.

Aspect 6 is the method of any of aspects 1 to 5, further including that the second transmission is associated with one or more TCI states of the plurality of TCI states.

Aspect 7 is the method of any of aspects 1 to 4, further including that the one or more second default QCL assumptions are different than the one or more first default QCL assumptions.

Aspect 8 is the method of any of aspects 1 to 4 and 7, further including that the one or more second default QCL assumptions are based on a TCI state of a control resource set (CORESET) associated with a monitored search space with a lowest CORESET identifier (CORESET-ID) in a latest slot in which one or more CORESETs within an active bandwidth part (BWP) of a serving cell of the base station are monitored.

Aspect 9 is the method of any of aspects 1 to 4, 7, and 8, further including that the one or more second default QCL assumptions are based on a selected reference signal (RS) index for beam failure recovery.

Aspect 10 is the method of any of aspects 1 to 4, and 7 to 9, further including that the one or more second default QCL assumptions are based on an initial control resource set (CORESET-0).

Aspect 11 is the method of any of aspects 1 to 4, and 7 to 10, further including that the at least one TCI codepoint indicating the plurality of TCI states comprises a plurality of TCI codepoints each indicating a first TCI state and a second TCI state, and that the one or more second default QCL assumptions are based on the first TCI state corresponding to a lowest codepoint of the plurality of TCI codepoints.

Aspect 12 is the method of any of aspects 1 to 4, and 7 to 11, further including that the second transmission is associated with a single TCI state of the plurality of TCI states.

Aspect 13 is the method of any of aspects 1 to 4, and 7 to 12, further including that the second transmission is associated with the single TCI state until a PDSCH medium access control (MAC) control element (MAC-CE) for TCI state activation indicating at least one TCI codepoint indicating a plurality of TCI states is received.

Aspect 14 is the method of any of aspects 1 to 13, further including resetting the at least one TCI codepoint to indicate a different TCI state or QCL assumption after identifying the second beam.

Aspect 15 is the method of any of aspects 1 to 14, further including that the at least one TCI codepoint is reset to indicate a QCL assumption of a selected reference signal (RS) index for beam failure recovery.

Aspect 16 is the method of any of aspects 1 to 15, further including that the at least one TCI codepoint is reset to indicate a QCL assumption of an initial control resource set (CORESET-0).

Aspect 17 is the method of any of aspects 1 to 16, further including that the at least one TCI codepoint indicating the plurality of TCI states is reset to indicate a single TCI state.

Aspect 18 is the method of any of aspects 1 to 17, further including that the second beam is identified further based on at least one of a random access channel (RACH) transmission to the base station or a beam failure recovery (BFR) message from the base station; and that the one or more second default QCL assumptions or the resetting of the at least one TCI codepoint are effective when a time after one of the BFD, the RACH transmission, or the BFR response reception exceeds a time threshold.

Aspect 19 is the method of any of aspects 1 to 18, further including determining the one or more second default QCL assumptions to be one of matching or different than the one or more first default QCL assumptions based on UE capability or a radio resource control (RRC) configuration from the base station.

Aspect 20 is the method of any of aspects 1 to 19, further including that the one or more second default QCL assumptions are determined to match the one or more first default QCL assumptions when a maximum number of active TCI states supported by the UE is greater than a threshold, and that the one or more second default QCL assumptions are determined to be different than the one or more first default QCL assumptions when the maximum number of active TCI states supported by the UE is less than the threshold.

Aspect 21 is the method of any of aspects 1 to 20, further including that the at least one TCI codepoint indicating the plurality of TCI states comprises a plurality of TCI codepoints, that the one or more first default QCL assumptions are based on one or more TCI states corresponding to a lowest codepoint of the plurality of TCI codepoints; and that the second beam is identified further in response to beam failure recovery (BFR) or radio link monitoring (RLM) based on a reference signal corresponding to at least one of the one or more first default QCL assumptions or the one or more TCI states when beam failure detection resources are not configured for the UE.

Aspect 22 is an apparatus for wireless communication including at least one processor coupled to a memory and configured to implement a method as in any of aspects 1 to 21.

Aspect 23 is an apparatus for wireless communication including means for implementing a method as in any of aspects 1 to 21.

Aspect 24 is a computer-readable medium storing computer executable code, where the code, when executed, causes a processor to implement a method as in any of aspects 1 to 21.

Aspect 25 is a method of wireless communication at a base station, comprising: sending a message to a user equipment (UE) indicating at least one transmission configuration indicator (TCI) codepoint indicating a plurality of TCI states; transmitting a first transmission of a physical downlink shared channel (PDSCH) based on one or more first default quasi co-location (QCL) assumptions; identifying a second beam in response to a beam failure of one or more first beams; and transmitting, after identifying the second beam, a second transmission based on one or more second default QCL assumptions, where at least one of the one or more first default QCL assumptions or the one or more second default QCL assumptions are based on the message.

Aspect 26 is the method of aspect 25, further including that the one or more first default QCL assumptions and the one or more second default QCL assumptions are effective when a time offset between downlink control information (DCI) reception and PDSCH reception is less than a QCL time duration threshold.

Aspect 27 is the method of any of aspect 25 or aspect 26, further including that the message comprises a PDSCH medium access control (MAC) control element (MAC-CE) for TCI state activation.

Aspect 28 is the method of any of aspects 25 to 27, further including that the second beam is identified based on a selected reference signal (RS) index for beam failure recovery.

Aspect 29 is the method of any of aspects 25 to 28, further including that the at least one TCI codepoint indicating the plurality of TCI states comprises a plurality of TCI codepoints, that the one or more first default QCL assumptions are based on one or more TCI states corresponding to a lowest codepoint of the plurality of TCI codepoints, and that the one or more second default QCL assumptions match the one or more first default QCL assumptions.

Aspect 30 is the method of any of aspects 25 to 29, further including that the second transmission is associated with one or more TCI states of the plurality of TCI states.

Aspect 31 is the method of any of aspects 25 to 28, further including that the one or more second default QCL assumptions are different than the one or more first default QCL assumptions.

Aspect 32 is the method of any of aspects 25 to 28 and 31, further including that the one or more second default QCL assumptions are based on a TCI state of a control resource set (CORESET) associated with a monitored search space with a lowest CORESET identifier (CORESET-ID) in a latest slot in which one or more CORESETs within an active bandwidth part (BWP) of a serving cell of the base station are monitored.

Aspect 33 is the method of any of aspects 25 to 28, 31, and 32, further including that the one or more second default QCL assumptions are based on a selected reference signal (RS) index for beam failure recovery.

Aspect 34 is the method of any of aspects 25 to 28 and 31 to 33, further including that the one or more second default QCL assumptions are based on an initial control resource set (CORESET-0).

Aspect 35 is the method of any of aspects 25 to 28 and 31 to 34, further including that the at least one TCI codepoint indicating the plurality of TCI states comprises a plurality of TCI codepoints each indicating a first TCI state and a second TCI state, and that the one or more second default QCL assumptions are based on the first TCI state corresponding to a lowest codepoint of the plurality of TCI codepoints.

Aspect 36 is the method of any of aspects 25 to 28 and 31 to 35, further including that the second transmission is associated with a single TCI state of the plurality of TCI states.

Aspect 37 is the method of any of aspects 25 to 28 and 31 to 36, further including that the second transmission is associated with the single TCI state until a PDSCH medium access control (MAC) control element (MAC-CE) for TCI state activation indicating at least one TCI codepoint indicating a plurality of TCI states is received.

Aspect 38 is the method of any of aspects 25 to 37, further including resetting the at least one TCI codepoint to indicate a different TCI state or QCL assumption after identifying the second beam.

Aspect 39 is the method of any of aspects 25 to 38, further including that the at least one TCI codepoint is reset to indicate a QCL assumption of a selected reference signal (RS) index for beam failure recovery.

Aspect 40 is the method of any of aspects 25 to 39, further including that the at least one TCI codepoint is reset to indicate a QCL assumption of an initial control resource set (CORESET-0).

Aspect 41 is the method of any of aspects 25 to 40, further including that the at least one TCI codepoint indicating the plurality of TCI states is reset to indicate a single TCI state.

Aspect 42 is the method of any of aspects 25 to 41, further including that the second beam is identified further based on at least one of a random access message from the UE or a beam failure recovery (BFR) message to the UE; and that the one or more second default QCL assumptions or the resetting of the at least one TCI codepoint are effective when a time after one of the BFD, the RACH transmission, or the BFR response reception exceeds a time threshold.

Aspect 43 is the method of any of aspects 25 to 42, further including configuring the one or more second default QCL assumptions to be one of matching or different than the one or more first default QCL assumptions based on UE capability or a radio resource control (RRC) configuration.

Aspect 44 is the method of any of aspects 25 to 43, further including that the one or more second default QCL assumptions are configured to match the one or more first default QCL assumptions when a maximum number of active TCI states supported by the UE is greater than a threshold, and that the one or more second default QCL assumptions are configured to be different than the one or more first default QCL assumptions when the maximum number of active TCI states supported by the UE is less than the threshold.

Aspect 45 is the method of any of aspects 25 to 44, further including that the at least one TCI codepoint indicating the plurality of TCI states comprises a plurality of TCI codepoints, that the one or more first default QCL assumptions are based on one or more TCI states corresponding to a lowest codepoint of the plurality of TCI codepoints; and that the second beam is identified further in response to beam failure recovery (BFR) or radio link monitoring (RLM) based on a reference signal corresponding to at least one of the one or more first default QCL assumptions or the one or more TCI states when beam failure detection resources are not configured for the UE.

Aspect 46 is an apparatus for wireless communication including at least one processor coupled to a memory and configured to implement a method as in any of aspects 25 to 45.

Aspect 47 is an apparatus for wireless communication including means for implementing a method as in any of aspects 25 to 45.

Aspect 48 is a computer-readable medium storing computer executable code, where the code, when executed, causes a processor to implement a method as in any of aspects 25 to 45.

What is claimed is:

1. A method of wireless communication at a user equipment (UE) comprising:
    receiving a message from a base station indicating at least one transmission configuration indicator (TCI) codepoint indicating a plurality of TCI states;
    receiving a first transmission of a physical downlink shared channel (PDSCH) based on one or more first default quasi co-location (QCL) assumptions;
    identifying a second beam in response to a beam failure detection (BFD) of one or more first beams; and
    receiving, after identifying the second beam, a second transmission based on one or more second default QCL assumptions, wherein at least one of the one or more first default QCL assumptions or the one or more second default QCL assumptions are based on the message.

2. The method of claim 1, wherein the one or more first default QCL assumptions and the one or more second default QCL assumptions are effective when a time offset between downlink control information (DCI) reception and PDSCH reception is less than a QCL time duration threshold.

3. The method of claim 1, wherein the message comprises a PDSCH medium access control (MAC) control element (MAC-CE) for TCI state activation.

4. The method of claim 1, wherein the second beam is identified based on a selected reference signal (RS) index for beam failure recovery.

5. The method of claim 1,
wherein the at least one TCI codepoint indicating the plurality of TCI states comprises a plurality of TCI codepoints,
wherein the one or more first default QCL assumptions are based on one or more TCI states corresponding to a lowest codepoint of the plurality of TCI codepoints, and
wherein the one or more second default QCL assumptions match the one or more first default QCL assumptions.

6. The method of claim 5, wherein the second transmission is associated with the one or more TCI states of the plurality of TCI states.

7. The method of claim 1, wherein the one or more second default QCL assumptions are different than the one or more first default QCL assumptions.

8. The method of claim 7, wherein the one or more second default QCL assumptions are based on a TCI state of a control resource set (CORESET) associated with a monitored search space with a lowest CORESET identifier (CORESET-ID) in a latest slot in which one or more CORESETs within an active bandwidth part (BWP) of a serving cell of the base station are monitored.

9. The method of claim 7, wherein the one or more second default QCL assumptions are based on a selected reference signal (RS) index for beam failure recovery.

10. The method of claim 7, wherein the one or more second default QCL assumptions are based on an initial control resource set (CORESET-0).

11. The method of claim 7,
wherein the at least one TCI codepoint indicating the plurality of TCI states comprises a plurality of TCI codepoints each indicating a first TCI state and a second TCI state, and
wherein the one or more second default QCL assumptions are based on the first TCI state corresponding to a lowest codepoint of the plurality of TCI codepoints.

12. The method of claim 7, wherein the second transmission is associated with a single TCI state of the plurality of TCI states.

13. The method of claim 12, wherein the second transmission is associated with the single TCI state until a PDSCH medium access control (MAC) control element (MAC-CE) for TCI state activation indicating at least one TCI codepoint indicating a plurality of TCI states is received.

14. The method of claim 1, further comprising:
resetting the at least one TCI codepoint to indicate a different TCI state or QCL assumption after identifying the second beam.

15. The method of claim 14, wherein the at least one TCI codepoint is reset to indicate a QCL assumption of a selected reference signal (RS) index for beam failure recovery.

16. The method of claim 14, wherein the at least one TCI codepoint is reset to indicate a QCL assumption of an initial control resource set (CORESET-0).

17. The method of claim 14, wherein the at least one TCI codepoint indicating the plurality of TCI states is reset to indicate a single TCI state.

18. The method of claim 14,
wherein the second beam is identified further based on at least one of a random access channel (RACH) transmission to the base station or a beam failure recovery (BFR) message from the base station; and
wherein the one or more second default QCL assumptions or the resetting of the at least one TCI codepoint are effective when a time after one of the BFD, the RACH transmission, or the BFR message exceeds a time threshold.

19. The method of claim 1, further comprising:
determining the one or more second default QCL assumptions to be one of matching or different than the one or more first default QCL assumptions based on UE capability or a radio resource control (RRC) configuration from the base station.

20. The method of claim 19,
wherein the one or more second default QCL assumptions are determined to match the one or more first default QCL assumptions when a maximum number of active TCI states supported by the UE is greater than a threshold, and
wherein the one or more second default QCL assumptions are determined to be different than the one or more first default QCL assumptions when the maximum number of active TCI states supported by the UE is less than the threshold.

21. The method of claim 1,
wherein the at least one TCI codepoint indicating the plurality of TCI states comprises a plurality of TCI codepoints, and the one or more first default QCL assumptions are based on one or more TCI states corresponding to a lowest codepoint of the plurality of TCI codepoints; and
wherein the second beam is identified further in response to beam failure recovery (BFR) or radio link monitoring (RLM) based on a reference signal corresponding to at least one of the one or more first default QCL assumptions or the one or more TCI states when beam failure detection resources are not configured for the UE.

22. An apparatus for wireless communication, comprising:
a memory; and
at least one processor coupled to the memory and configured to:
receive a message from a base station indicating at least one transmission configuration indicator (TCI) codepoint indicating a plurality of TCI states;
receive a first transmission of a physical downlink shared channel (PDSCH) based on one or more first default quasi co-location (QCL) assumptions;
identify a second beam in response to a beam failure detection (BFD) of one or more first beams; and
receive, after identifying the second beam, a second transmission based on one or more second default QCL assumptions, wherein at least one of the one or more first default QCL assumptions or the one or more second default QCL assumptions are based on the message.

23. A method of wireless communication at a base station comprising:

sending a message to a user equipment (UE) indicating at least one transmission configuration indicator (TCI) codepoint indicating a plurality of TCI states;

transmitting a first transmission of a physical downlink shared channel (PDSCH) based on one or more first default quasi co-location (QCL) assumptions;

identifying a second beam in response to a beam failure of one or more first beams; and transmitting, after identifying the second beam, a second transmission based on one or more second default QCL assumptions, wherein at least one of the one or more first default QCL assumptions or the one or more second default QCL assumptions are based on the message.

24. The method of claim 23, wherein the one or more first default QCL assumptions and the one or more second default QCL assumptions are effective when a time offset between downlink control information (DCI) transmission and PDSCH transmission is less than a QCL time duration threshold.

25. The method of claim 23, wherein the message comprises a PDSCH medium access control (MAC) control element (MAC-CE) for TCI state activation.

26. The method of claim 23, wherein the one or more second default QCL assumptions are different than the one or more first default QCL assumptions.

27. The method of claim 23, further comprising:
resetting the at least one TCI codepoint to indicate a different TCI state or QCL assumption after identifying the second beam.

28. The method of claim 23, further comprising:
configuring the one or more second default QCL assumptions to be one of matching or different than the one or more first default QCL assumptions based on UE capability or a radio resource control (RRC) configuration.

29. The method of claim 23,
wherein the at least one TCI codepoint indicating the plurality of TCI states comprises a plurality of TCI codepoints, and the one or more first default QCL assumptions are based on one or more TCI states corresponding to a lowest codepoint of the plurality of TCI codepoints; and wherein the second beam is identified further in response to beam failure recovery (BFR) or radio link monitoring (RLM) based on a reference signal (RS) corresponding to at least one of the one or more first default QCL assumptions or the one or more TCI states when beam failure detection resources are not configured for the UE.

30. An apparatus for wireless communication, comprising:
a memory; and
at least one processor coupled to the memory and configured to:
send a message to a user equipment (UE) indicating at least one transmission configuration indicator (TCI) codepoint indicating a plurality of TCI states;
transmit a first transmission of a physical downlink shared channel (PDSCH) based on one or more first default quasi co-location (QCL) assumptions;
identify a second beam in response to a beam failure of one or more first beams; and
transmit, after identifying the second beam, a second transmission based on one or more second default QCL assumptions, wherein at least one of the one or more first default QCL assumptions or the one or more second default QCL assumptions are based on the message.

* * * * *